US012745260B2

(12) United States Patent
Xu et al.

(10) Patent No.: US 12,745,260 B2
(45) Date of Patent: Sep. 22, 2026

(54) ASSOCIATING MULTIPLE-STAGE DOWNLINK CONTROL INFORMATION

(71) Applicant: QUALCOMM Incorporated, San Diego, CA (US)

(72) Inventors: Huilin Xu, Temecula, CA (US); Xiao Feng Wang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 405 days.

(21) Appl. No.: 18/348,206

(22) Filed: Jul. 6, 2023

(65) Prior Publication Data

US 2025/0016795 A1 Jan. 9, 2025

(51) Int. Cl.
*H04W 72/23* (2023.01)
*H04L 5/00* (2006.01)
*H04W 72/232* (2023.01)

(52) U.S. Cl.
CPC ......... *H04W 72/232* (2023.01); *H04L 5/0053* (2013.01)

(58) Field of Classification Search
CPC ........................... H04W 72/232; H04L 5/0053
See application file for complete search history.

(56) References Cited

U.S. PATENT DOCUMENTS

| | | | | |
|---|---|---|---|---|
| 2019/0379486 | A1* | 12/2019 | Hwang | H04L 1/0047 |
| 2020/0359407 | A1* | 11/2020 | Takeda | H04W 72/23 |
| 2022/0104245 | A1* | 3/2022 | Xu | H04L 5/0053 |
| 2022/0200671 | A1 | 6/2022 | Wu et al. | |
| 2023/0057605 | A1* | 2/2023 | Jazi | H04L 5/0053 |
| 2023/0125414 | A1* | 4/2023 | Gong | H04W 88/025 |
| 2023/0284139 | A1* | 9/2023 | Ma | H04B 7/0626 |
| 2023/0328758 | A1* | 10/2023 | Tang | H04L 25/03866 |

OTHER PUBLICATIONS

International Search Report and Written Opinion—PCT/US2024/030791—ISA/EPO—Sep. 18, 2024.

* cited by examiner

*Primary Examiner* — Ronald B Abelson
(74) *Attorney, Agent, or Firm* — Harrity & Harrity, LLP

(57) ABSTRACT

Various aspects of the present disclosure generally relate to wireless communication. In some aspects, a user equipment (UE) may receive an indication of an association between first-stage downlink control information (DCI) and second-stage DCI. The UE may recover the second-stage DCI based at least in part on the indication of the association. Numerous other aspects are described.

30 Claims, 13 Drawing Sheets

300
Service Management and Orchestration (SMO) Framework
Non-Real Time RAN Intelligent Controller (RIC)
305
315
Core Network
320
Backhaul link
O1
A1
Near-Real Time RAN Intelligent Controller (RIC)
325
E2
O-eNB
311
O1
O2
O-Cloud
390
CU
310
E2
Midhaul link
DU
330
Fronthaul link
RU
340
UE
120
Access link

800

900

ASSOCIATING MULTIPLE-STAGE DOWNLINK CONTROL INFORMATION

FIELD OF THE DISCLOSURE

Aspects of the present disclosure generally relate to wireless communication and to techniques and apparatuses for associating multiple-stage downlink control information.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication of an association between first-stage downlink control information (DCI) and second-stage DCI. The method may include recovering the second-stage DCI based at least in part on the indication of the association.

Some aspects described herein relate to a method of wireless communication performed by a network node. The method may include transmitting an indication of an association between first-stage DCI and second-stage DCI. The method may include transmitting at least the first-stage DCI based at least in part on the association.

Some aspects described herein relate to an apparatus for wireless communication at a UE. The apparatus may include one or more memories and one or more processors coupled to the one or more memories. The one or more processors may be configured, individually or collectively, to receive an indication of an association between first-stage DCI and second-stage DCI. The one or more processors may be configured to recover the second-stage DCI based at least in part on the indication of the association.

Some aspects described herein relate to an apparatus for wireless communication at a network node. The apparatus may include one or more memories and one or more processors coupled to the one or more memories. The one or more processors may be configured, individually or collectively, to transmit an indication of an association between first-stage DCI and second-stage DCI. The one or more processors may be configured to transmit at least the first-stage DCI based at least in part on the association.

Some aspects described herein relate to a non-transitory computer-readable medium that stores a set of instructions for wireless communication by a UE. The set of instructions, when executed by one or more processors of the UE, may cause the UE to receive an indication of an association between first-stage DCI and second-stage DCI. The set of instructions, when executed by one or more processors of the UE, may cause the UE to recover the second-stage DCI based at least in part on the indication of the association.

Some aspects described herein relate to a non-transitory computer-readable medium that stores a set of instructions for wireless communication by a network node. The set of instructions, when executed by one or more processors of the network node, may cause the network node to transmit an indication of an association between first-stage DCI and second-stage DCI. The set of instructions, when executed by one or more processors of the network node, may cause the network node to transmit at least the first-stage DCI based at least in part on the association.

Some aspects described herein relate to an apparatus for wireless communication. The apparatus may include means for receiving an indication of an association between first-stage DCI and second-stage DCI. The apparatus may include means for recovering the second-stage DCI based at least in part on the indication of the association.

Some aspects described herein relate to an apparatus for wireless communication. The apparatus may include means for transmitting an indication of an association between first-stage DCI and second-stage DCI. The apparatus may include means for transmitting at least the first-stage DCI based at least in part on the association.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
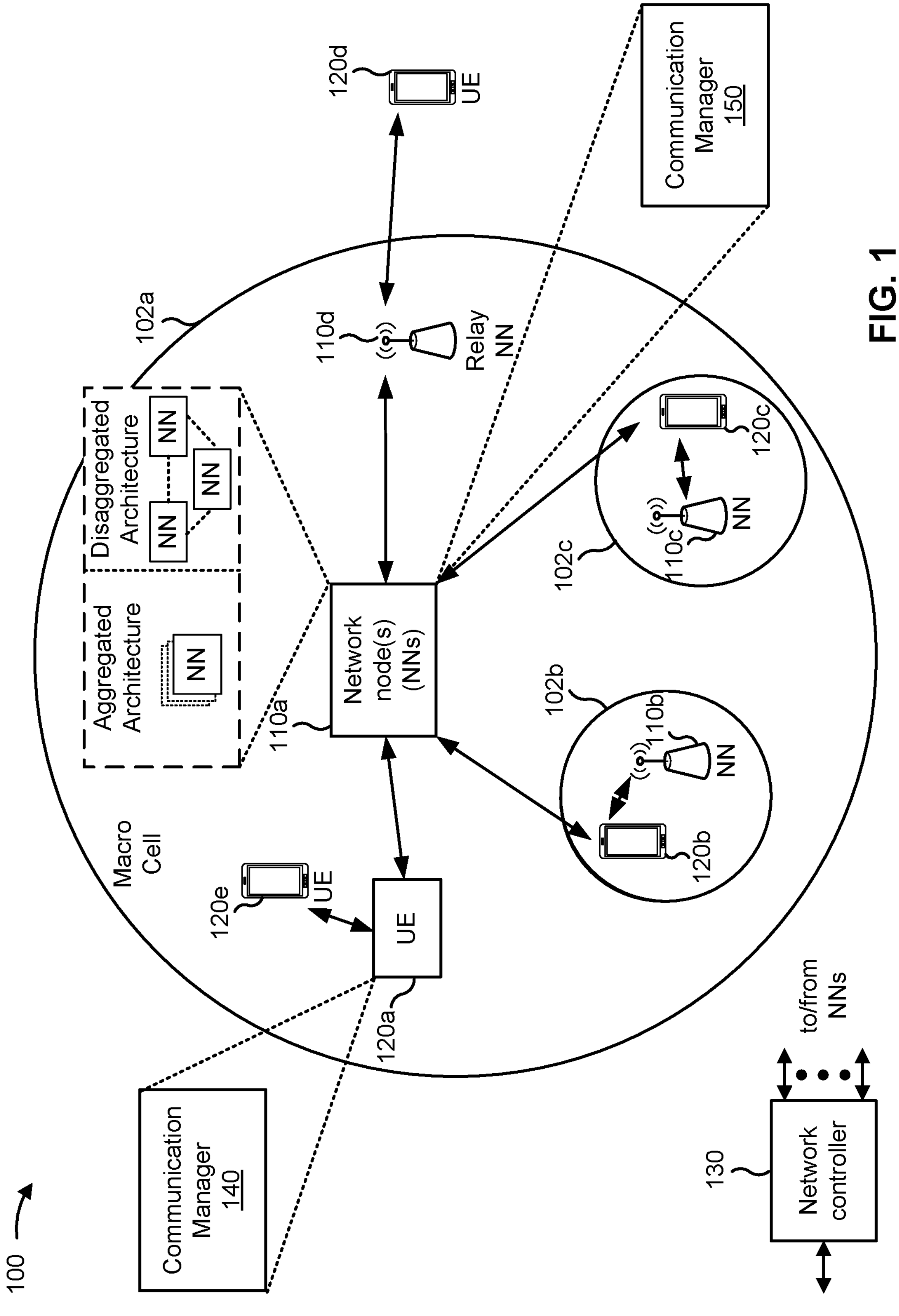
FIG. 1 is a diagram illustrating an example of a wireless network, in accordance with the present disclosure.

"Single-stage downlink control information (DCI)" may denote DCI that indicates transmission information in a single transmission, and "multiple-stage (multi-stage) DCI" may denote DCI that indicates the transmission information in multiple transmissions. Single-stage DCI may use a less amount of signaling relative to multi-stage DCI, and multi-stage DCI may provide more flexibility, use fewer air interface resources, utilize less decoding power, and/or support more features (e.g., legacy features and/or new features) relative to multiple single-stage DCI, such as an ability to configure each stage of a multi-stage DCI with different transmission configurations.

To illustrate, each transmission associated with multi-stage DCI may have different operating criteria and/or different operating priorities from one another such that a network node uses different transmission configurations for each stage to satisfy the different operating criteria. As one example, each stage of a multi-stage DCI may be associated with a respective control resource set (CORESET) and/or a respective a search space (SS) set configuration. However, different CORESET configurations and/or different SS set configurations for the stages of multi-stage DCI may make DCI detection and/or recovery by a UE difficult. Without a mechanism to associate the stages, a UE may fail to detect and/or recover the correct second-stage DCI that is associated with a first-stage DCI. Failure to recover first-stage DCI and/or the related second-stage DCI may result in the UE failing to obtain transmission information and, subsequently, fail to transmit and/or receive communications with a network node.

Various aspects described herein generally relate to associating two-stage DCI. Some aspects more specifically relate to a network node indicating the association to a UE. In some aspects, a UE may receive an indication of an association between first-stage DCI and second-stage DCI. Based at least in part on receiving the indication of the association, the UE may recover the second stage DCI. That is, the UE may recover the correct second-stage DCI that is associated with a first-stage DCI and, subsequently, recover transmission information that is synchronized with a network node.

Indicating an association between first-stage DCI and second-stage DCI may enable a network node to configure the stages of multi-stage DCI differently to satisfy operating criteria and/or to preserve air interface resources. Alternatively, or additionally, indicating the association provide a UE with an ability to detect and/or recover the correct second-stage DCI that is associated with first-stage DCI and, subsequently, transmit and/or receive communications with the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a user equipment (UE) 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB)

node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., one or more memory components) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a UE (e.g., a UE 120) may include a communication manager 140. As described in more detail elsewhere herein, the communication manager 140 may receive an indication of an association between first-stage DCI and second-stage DCI; and recover the second-stage DCI based at least in part on the indication of the association. Additionally, or alternatively, the communication manager 140 may perform one or more other operations described herein.

In some aspects, a network node (e.g., a network node 110) may include a communication manager 150. As described in more detail elsewhere herein, the communication manager 150 may transmit an indication of an association between first-stage DCI and second-stage DCI; and transmit at least the first-stage DCI based at least in part on the association. Additionally, or alternatively, the communication manager 150 may perform one or more other operations described herein.

As indicated above, FIG. 1 is provided as an example. Other examples may differ from what is described with regard to FIG. 1.

Figure 2:
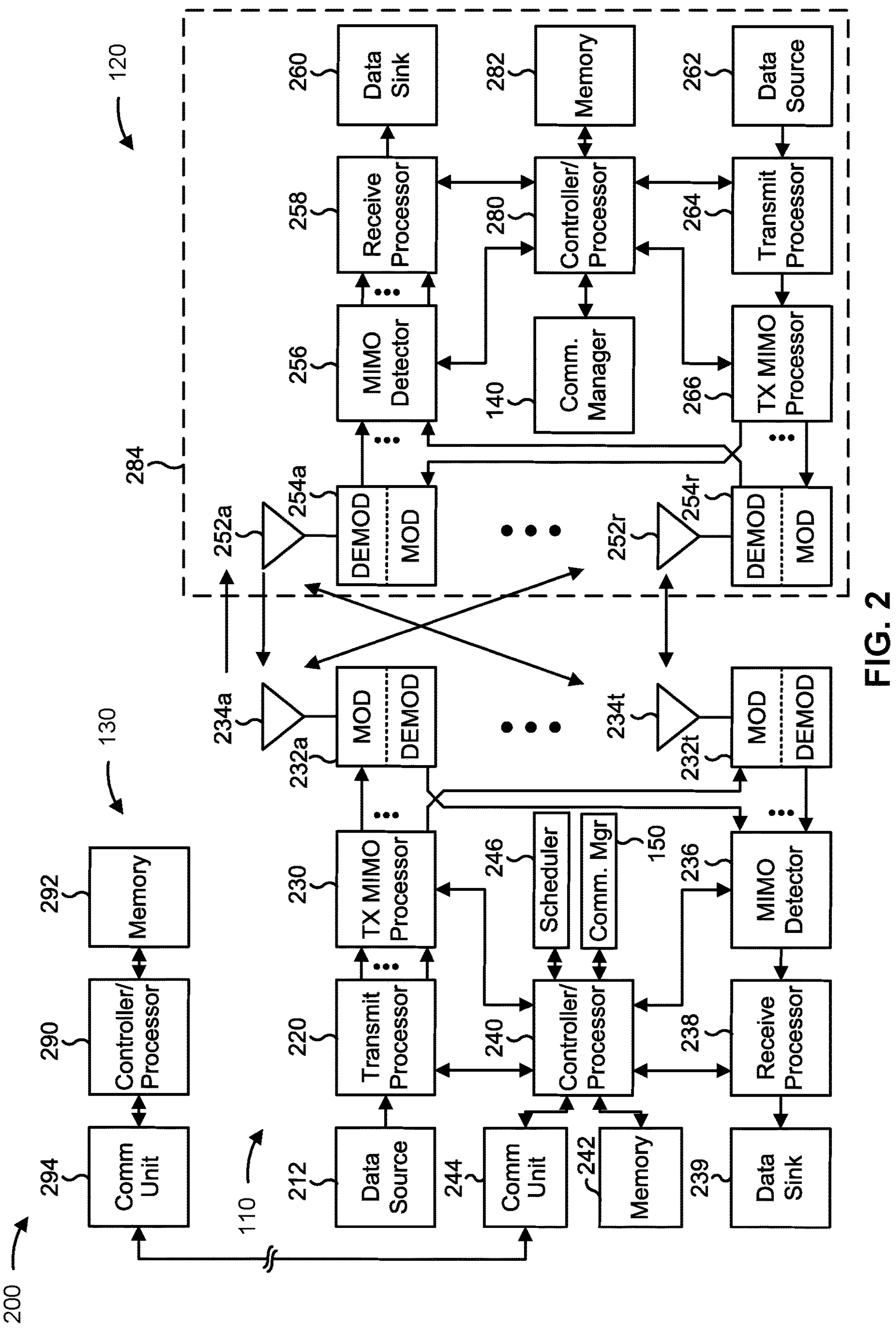
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas (T≥1). The UE 120 may be equipped with a set of antennas 252*a* through 252*r*, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. For visual clarity, FIG. 2 shows the memory 292 as a single memory, but other examples of the memory 292 may include multiple memories (e.g., two or more memory components). The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and a memory 282 to perform aspects of any of the methods described herein (e.g., with reference to FIGS. 4-11). For visual clarity, FIG. 2 shows the memory 282 as a single memory, but other examples of the memory 282 may include multiple memories (e.g., two or more memory components).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and a memory 242 to perform aspects of any of the methods described herein (e.g., with reference to FIGS. 4-11). For visual clarity, FIG. 2 shows the memory 242 as a single memory, but other examples of the memory 242 may include multiple memories (e.g., two or more memory components).

The controller/processor 240 of the network node 110, the controller/processor 280 of the UE 120, and/or any other component(s) of FIG. 2 may perform one or more techniques associated with associating multiple-stage DCI, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, a UE (e.g., a UE 120) includes means for receiving an indication of an association between first-stage DCI and second-stage DCI; and/or means for recovering the second-stage DCI based at least in part on the indication of the association. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., a network node 110) includes means for transmitting an indication of an association between first-stage DCI and second-stage DCI; and/or means for transmitting at least the first-stage DCI based at least in part on the association. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors.

Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
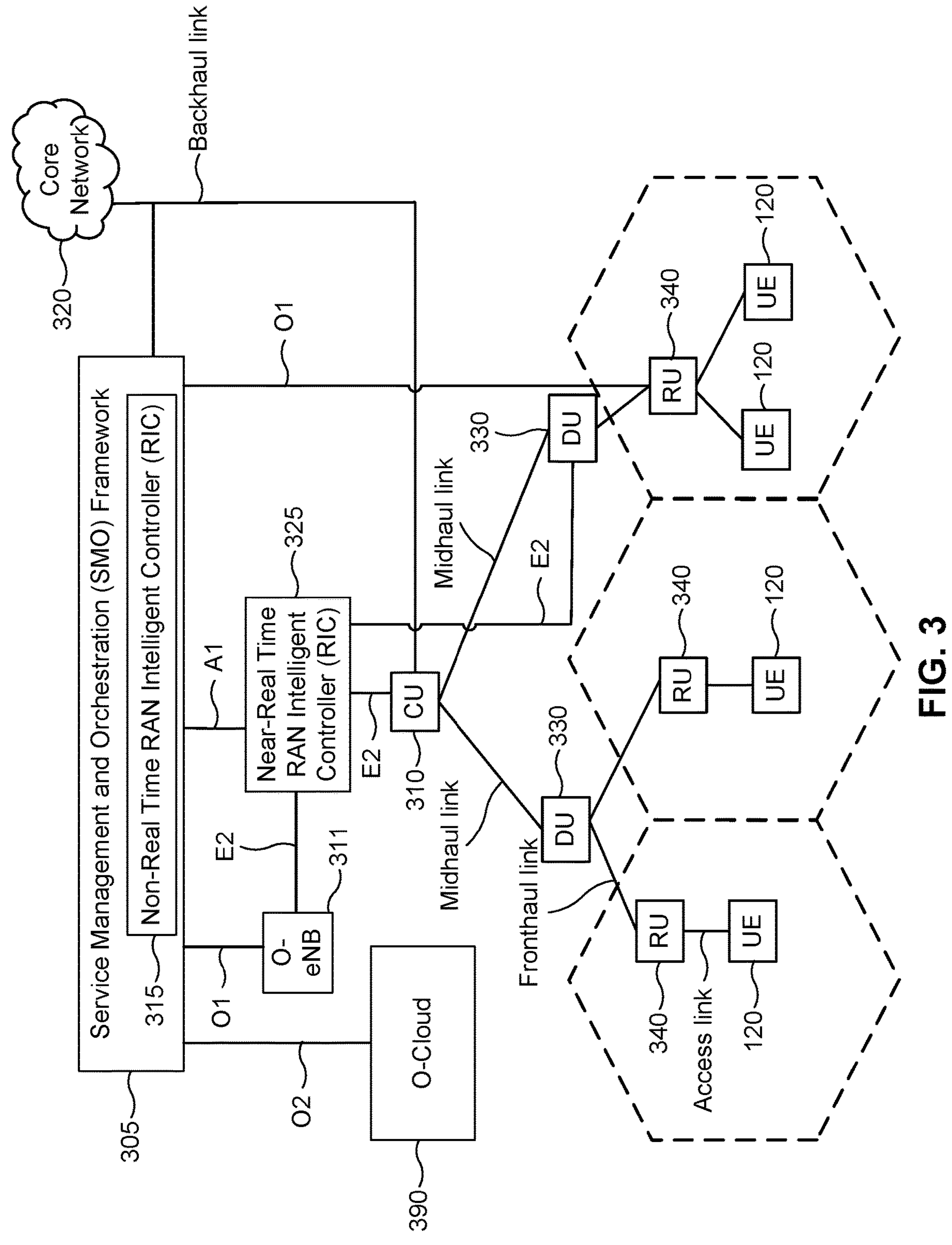
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
FIG. 4 is a diagram illustrating an example of downlink control information (DCI) that schedules one or more communications with a UE, in accordance with the present disclosure.
Figure 4:
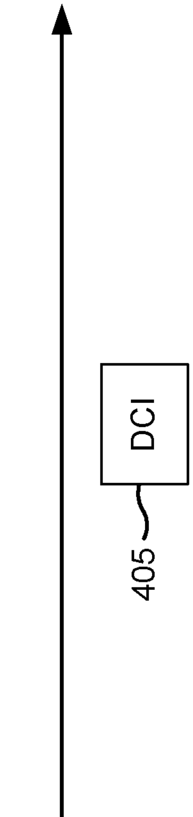
Figure 4:
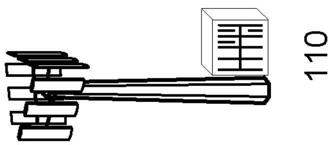

FIG. 4 is a diagram illustrating an example 400 of DCI that schedules one or more communications with a UE, in accordance with the present disclosure. As shown in FIG. 4, a network node 110 may communicate DCI to a UE 120 directly, but other examples may include the network node 110 communicating the DCI to the UE 120 via one or more network nodes.

The network node 110 may transmit, to the UE 120 (e.g., directly or via one or more network nodes), DCI 405 that schedules one or more communications for the UE 120. In some aspects, the network node 110 may transmit the DCI 405 in a physical downlink control channel (PDCCH) and/or using Layer 1 signaling. "Downlink DCI" may refer to DCI that schedules a downlink communication (e.g., a physical downlink shared channel (PDSCH) communication and/or a channel state information reference signal (CSI-RS)) to the UE 120, and "uplink DCI" may refer to DCI that schedules an uplink communication (e.g., a physical uplink shared channel (PUSCH) communication or a sounding reference signal (SRS)) from the UE. The DCI 405 may indicate any combination of transmission information, such as a transmission format, an MCS, a resource allocation, and/or other types of information used by a transmitter to encode, and/or receiver to decode, transmitted data.

The DCI 405 may be configured in a variety of DCI formats that partition the DCI 405 into different bitfields that may be of varying length. Each DCI format may be associated with a different transmission direction and/or communication channel. As one example, "DCI Format 0_1" may be associated with a first communication configuration for a PUSCH communication and "DCI Format 0_2" may be associated with a second communication configuration for a PUSCH communication. "DCI Format 1_0" may be associated with a third communication configuration for a PDSCH communication and "DCI Format 1_1" may be associated with a fourth communication configuration for a PDSCH communication. "DCI Format 0_1" and "DCI Format 0_2" may both be referred to as uplink DCI, and DCI Format 1_0" and "DCI Format 1_1" may both be referred to as downlink DCI.

Each format may partition the DCI 405 differently such that each DCI format includes a different combination of bitfields relative to the other DCI formats. In some aspects, at least two DCI formats (e.g., one or more uplink DCI formats and/or one or more downlink DCI formats) may include a same bitfield (e.g., a same bit length in a same location of the DCI), such as a DCI format indicator field.

Alternatively, or additionally, at least two DCI formats may include bitfields that indicate same transmission information and are positioned at different locations in the DCI and/or have a different bit length. For example, "DCI Format 1_0" and "DCI Format 0_1" may each include a respective MCS bitfield that is positioned at different locations in the DCI. In some aspects, uplink DCI formats (e.g., "DCI Format 0_1" and/or "DCI Format 0_2") may include one or more bitfields that are associated with uplink transmission information, and downlink DCI formats (e.g., "DCI Format 1_0" and/or "DCI Format 1_1") may include one or more bitfields that are associated with downlink transmission information.

"Single-stage DCI" may denote DCI that indicates transmission information in a single transmission, and "multiple-stage (multi-stage) DCI" may denote DCI that indicates the transmission information in multiple transmissions. As one example of multi-stage DCI, two-stage DCI may indicate transmission information based at least in part on using two transmissions: a first-stage DCI transmission and a second-stage DCI transmission. Single-stage DCI may use a less amount of signaling relative to multi-stage DCI, and multi-stage DCI may provide more flexibility, use fewer air interface resources, utilize less decoding power, and/or support more features (e.g., legacy features and/or new features) relative to multiple single-stage DCI. As one example, multi-stage DCI may provide flexibility in how each transmission is configured.

In some aspects, each transmission associated with multi-stage DCI may have different operating criteria and/or different operating priorities from one another. For instance, a UE 120 may use blind detection (alternatively referred to as blind decoding) to detect first-stage DCI, and an associated operating priority may be reducing an amount of blind detection performed by a UE to preserve a battery life of the UE and/or reducing an acquisition time by the UE (e.g., detection and recovery). Alternatively, or additionally, the second-stage DCI may be associated with an operating priority to avoid having the UE perform blind detection to detect the second-stage DCI. Accordingly, and based at least in part on the associated operating priorities, the first-stage DCI may be associated with a reduced number of PDCCH candidates within a PDCCH monitoring occasion (PMO), a reduced number of PMOs, and/or a reduced number of control channel elements (CCEs) relative to the second-stage DCI. Alternatively, or additionally, the second-stage DCI may be associated with a higher number of PDCCH candidates within a PMO, a higher number of PMOs, and/or a higher number of CCEs relative to the first-stage DCI to provide a network node with more flexibility on transmitting second-stage DCI to one or more UEs.

A bandwidth for PDCCH monitoring that is associated with monitoring for a DCI transmission may be based at least in part on a CORESET configuration. Alternatively, or additionally, a number of PDCCH candidates and/or a time domain pattern of PMOs (e.g., a number of PMOs and/or respective time spans of the PMOs) associated with the transmission of DCI may be based at least in part on an SS set configuration. A CORESET may refer to a control region of resources that is structured to support an efficient use of the resources, such as by flexible configuration or reconfiguration of the resources for one or more PDCCHs associated with a UE. An SS set may refer to an area and/or particular resources within the CORESET that are associated with PDCCH and/or DCI transmissions. That is, an SS set may indicate which regions of the CORESET to monitor for PDCCH and/or DCI transmissions. Accordingly, a first CORESET configuration and/or a first SS set configuration may be more suitable for first-stage DCI than second-stage DCI (and/or vice versa with a second CORESET configuration and/or second SS set configuration) to provide efficient use of air interface resources within a wireless network and, subsequently, increase a capacity of the wireless network. That is, using a same CORESET configuration and/or same SS set configuration for first-stage DCI and second-stage DCI may result in inefficient use of air interface resources and decrease the capacity of the wireless network. However, different CORESET configurations and/or different SS set configurations for the stages of multi-stage DCI may make DCI detection and/or recovery by a UE difficult. Without a mechanism to associate the stages, a UE may fail to detect and/or recover the correct second-stage DCI that is associated with the first-stage DCI. Failure to recover first-stage DCI and/or the related second-stage DCI may result in the UE failing to obtain transmission information and, subsequently, fail to transmit and/or receive communications with a network node.

Some techniques and apparatuses described herein provide associating two-stage DCI. In some aspects, a UE may receive an indication of an association between first-stage DCI and second-stage DCI. As one example, the UE may receive first PDCCH configuration information that is associated with the first-stage DCI and second PDCCH configuration information that is associated with the second-stage DCI. To illustrate, the UE may receive the first PDCCH configuration information and/or the second PDCCH configuration information in an RRC message. In some aspects, the first PDCCH configuration information and the second PDCCH configuration may specify a same identifier (e.g., a two-stage DCI identifier as described below). That is, the indication of the association between the first-stage DCI and the second-stage DCI may be the first PDCCH configuration information and the second PDCCH configuration information specifying the same identifier. Based at least in part on receiving the indication of the association, the UE may recover the second stage DCI.

Indicating an association between first-stage DCI and second-stage DCI may enable a network node to configure the first-stage DCI and the second-stage DCI with different resources to meet operating criteria and/or preserve air interface resource. Indicating an association between first-stage DCI and second-stage DCI may also provide a UE with an ability to detect and/or recover the correct second-stage DCI that is associated with first-stage DCI and, subsequently, transmit and/or receive communications with the network node.

As one example, the ability to indicate an association between first-stage DCI and second-stage DCI may enable the network node to configure the first-stage DCI and the second-stage DCI based at least in part on different CORESETs and/or different SS sets in a manner that preserves air interface resources in a wireless network and/or increases capacity of the wireless network. For instance, the network node may select a first configuration for the first-stage DCI that has fewer air interface resource relative to a second configuration for the second-stage DCI. To illustrate, the network node may select, as at least part of the first configuration, a first CORESET that has a reduced bandwidth relative to a second CORESET associated with the second-stage DCI. In some aspects, the first-stage DCI and/or the first configuration may be based at least in part on reducing blind detection performed by the UE to preserve a battery life of the UE, such as by reducing a number of CCEs, a number of configured PDCCH candidates within a PMO, and/or a number of PMOs associated with the first-stage DCI as described above. In some aspects, the ability to configure the multi-stage DCI with on different CORESETs and/or different SS sets may enable the network node to increase a number of configured PDCCH candidates per PMO, a number of PMOs (e.g., one PMO per slot and/or one PMO per mini-slot), and/or a number of CCEs of the second configuration (e.g., relative to the first configuration) to provide more options for transmitting the second-stage DCI that may improve the transmission (e.g., by selecting resources that may increase a power level, may reduce interference, and/or may be optimized for a particular UE implementation).

As indicated above, FIG. 4 is provided as an example. Other examples may differ from what is described with respect to FIG. 4.

FIGS. 5A, 5B, 5C, 5D, and 5E are diagrams illustrating a first example 500, a second example 502, a third example 504, a fourth example 506, and a fifth example 508, respectively, of associating multiple stages of multi-stage DCI, in accordance with the present disclosure.

Multi-stage DCI may provide more flexibility and/or support more features (e.g., legacy features and/or new features) relative to single-stage DCI. For instance, and as described above, each transmission of the multi-stage DCI may be configured based at least in part on different operating criteria and/or different operating priorities. A first-stage DCI transmission may be configured to use fewer air interface resources, use a smaller bandwidth, reduce blind detection performed by a UE, and/or shorten an acquisition time (e.g., detection and/or decoding) by a UE relative to a second-stage DCI transmission. A second-stage DCI transmission may be configured to provide more transmission options and/or enable parallel processing at a UE. To illustrate, a network node may schedule one or more downlink resources via first-stage DCI (e.g., of a two-stage DCI) before receiving a hybrid automatic repeat request (HARQ) acknowledgement that is associated with a prior PDSCH communication. A UE receiving the first-stage DCI may begin generating a channel estimation (e.g., based at least in part on analyzing a reference signal) before receiving a second-stage DCI of the two-stage DCI. That is, the UE may perform some processing in parallel with the network node preparing and/or transmitting the second-stage DCI based at least in part on information included in the first-stage DCI. Alternatively, or additionally, the UE may begin preparing uplink data based at least in part on receiving first-stage DCI that is associated with an uplink communication. Accordingly, the UE may perform processing for an uplink communication in parallel with the network node preparing and/or transmitting the second-stage DCI, resulting in a reduce processing time relative to serial processing.

In some aspects, and as described above, multi-stage DCI may reduce an amount of blind detection performed by a UE based at least in part on configuration of the first-stage DCI (e.g., a number of associated resources, a number of PMOs, a number of PDCCH candidates, and/or a periodicity). Alternatively, or additionally, multi-stage DCI may enable a network node to reduce control signaling overhead in a wireless network (e.g., relative to single-stage DCI). To illustrate, the network node may indicate common scheduling information and/or common transmission information in the first-stage DCI for multiple UEs (e.g., common to multiple second-stage DCI associated with multiple UEs) and transmission-specific scheduling information (e.g., specific to a scheduled transmission) and/or joint scheduling information in the second-stage DCI. In some aspects, a network node may use different transmission characteristics for first-stage DCI and a related second-stage DCI. To illustrate, the network node may transmit the first-stage DCI using first transmission configuration that is more robust relative to a second transmission configuration associated with the second-stage DCI. As one example, the first transmission configuration may use a wider beam configuration relative to the second transmission configuration to increase a probability of a UE receiving the first DCI. Alternatively, or additionally, the second transmission configuration may use a narrower beam relative to the first transmission configuration to increase a spectral efficiency of the second-stage DCI transmission. Accordingly, a network node may use different transmission configurations for multi-stage DCI to reduce resource waste, increase a detection probability, and/or preserve a battery life of a UE (e.g., by reduce UE processing, such as an amount of blind detection). In some aspects, and based at least in part on using different transmission configurations for the multi-stage DCI (e.g., different CORESETs and/or different SS sets), the network node may transmit an indication of an association between first-stage DCI and second-stage DCI to enable a UE to detect and/or recover an entirety of transmission information.

Figures 5A, 5B:
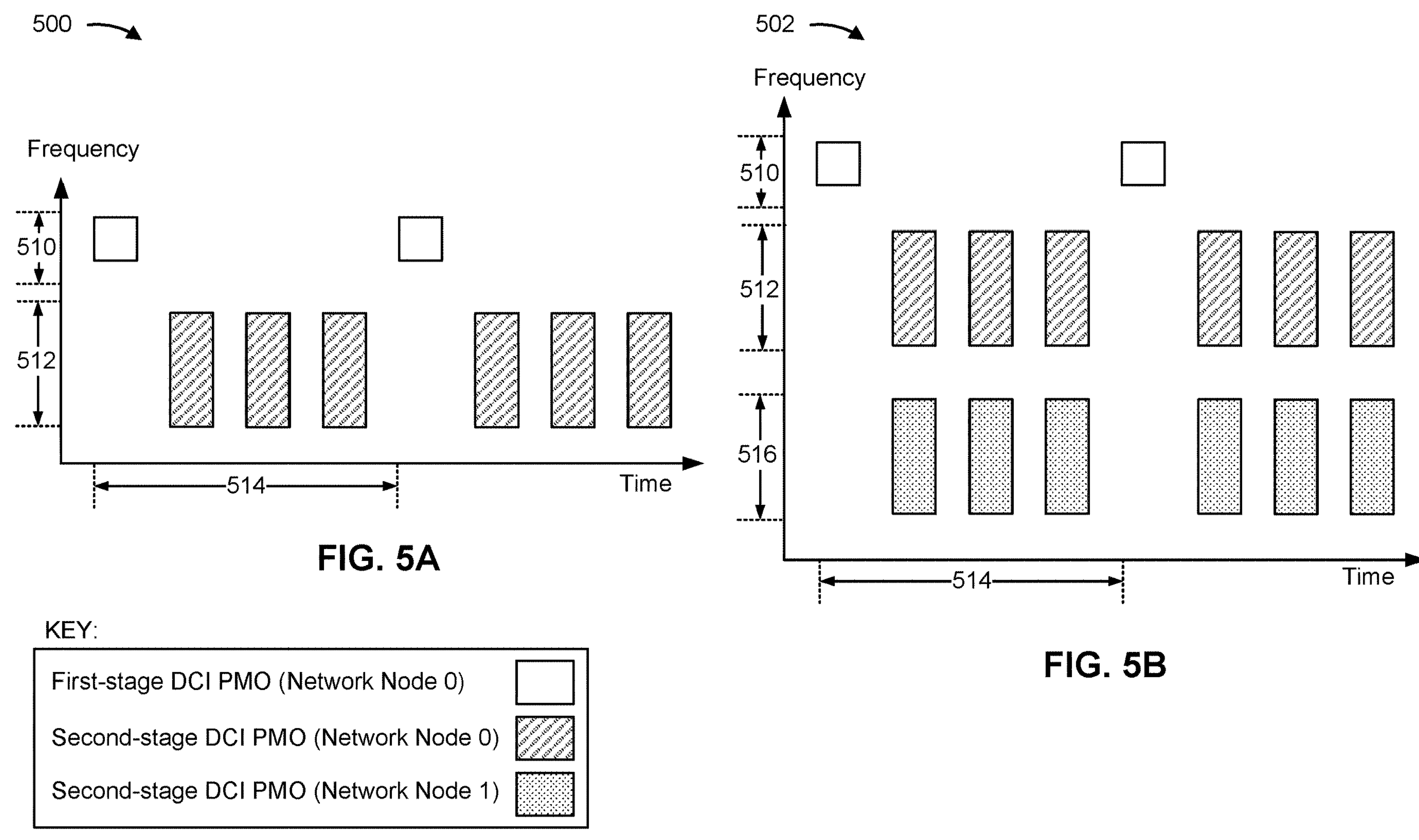
FIGS. 5A, 5B, 5C, 5D, and 5E are diagrams illustrating a first example, a second example, a third example, a fourth example, and a fifth example, respectively, of associating multiple stages of multi-stage DCI, in accordance with the present disclosure.

FIG. 5A illustrates a first example 500 of associating the stages of multi-stage DCI. "Associating the stages" may denote associating at least a first transmission to at least a second transmission. In the first example 500, the multi-stage DCI is in the form of two-stage DCI, a horizontal axis represents time, and a vertical axis represents frequency. First-stage DCI PMOs are shown in solid white and second-stage DCI PMOs are shown with a diagonal pattern. The first-stage DCI PMOs may be based at least in part on a first CORESET bandwidth shown by reference number 510 and the second-stage DCI PMOs may be based at least in part on a second CORESET bandwidth shown by reference number 512. In some aspects, the first CORESET bandwidth may be smaller than the second CORESET bandwidth. Over a duration shown by reference number 514, the first-stage DCI may be associated with a first number of PMOs (shown as one) and the second-stage DCI may be associated with a second number of PMOs (shown as three). As one example, one first-stage DCI transmitted in a first-stage DCI PMO may be associated with three second-stage DCIs that are each transmitted in a respective second-stage DCI PMO. In some aspects, a network node (e.g., a network node 110) may configure the first number of PMOs to be fewer than the second number of PMOs to reduce a number of blind detections performed by a UE. As one example, the network node may transmit configuration information that indicates a respective configuration (e.g., time resources and/or frequency resources) for any combination of the first-stage DCI PMOs, the second-stage DCI PMOs, the first CORESET bandwidth, and/or the second CORESET bandwidth.

As one example, the network node may transmit first SS set configuration information that indicates which time resources and/or frequency resources of a first CORESET to monitor for the first-stage DCI and second SS set configuration information that indicates which time resources and/or frequency resources of a second CORESET to monitor for the second-stage DCI. To illustrate, the network node may transmit one or more search space information elements (IE) in one or more RRC messages, and each search space IE may indicate respective SS set configuration information. Alternatively, or additionally, the network node may transmit first CORESET configuration information and/or second CORESET configuration information (e.g., information that indicates the respective frequency resources included in the first CORESET and/or the second CORESET), such as by indicating the respective CORESET configuration information via one or more CORESET IEs included in one or more RRC messages.

To indicate an association between first-stage DCI and second-stage DCI, the network node may include a two-stage DCI association identifier (ID) in each of the search space IEs and/or each of the CORESET IEs and may set the respective two-stage DCI association IDs to a same value and/or a same ID. As one example, the network node may transmit a first search space IE that is associated with the first-stage DCI and a second search space IE that is associated with the second-stage DCI. In some aspects, each search space set indicated by the respective search space IE may be associated with a single (respective) CORESET. The network node may include, in each search space IE, a respective two-stage DCI search space association ID field (e.g., twoStageDCISSAssociationID). To indicate an association between the first-stage DCI and the second-stage DCI, the network node may set the respective two-stage DCI search space association ID fields to a same value and/or a same ID. Accordingly, the network node may configure first-stage DCI PMOs based at least in part on a first CORESET with a first bandwidth and second-stage DCI PMOs based at least in part on a second CORESET with a second bandwidth. That is, a network node may associate two CORESETs with different bandwidths to two-stage DCI and/or two-stage DCI monitoring (e.g., PMOs).

As another example, the network node may transmit a first CORESET IE that is associated with the first-stage DCI and a second CORESET IE that is associated with the second-stage DCI. The network node may include, in each CORESET IE, a respective two-stage DCI CORESET association ID field (e.g., twoStageDCICORESETAssociationID). To indicate an association between the first-stage DCI and the second-stage DCI, the network node may set the respective two-stage DCI CORESET association ID fields to a same value and/or a same ID. In some aspects, the respective SS sets associated with the two CORESETs may be configured with a same SS ID, but may have different and/or independent configurations for one or more other first-stage DCI and second-stage DCI parameters. That is, the SS ID may be used to indicate a two-stage DCI association without the addition of an association field (e.g., a twoStageDCISSAssociationID field) in the search space IE. Example parameters that may be different between a first-stage DCI search space set and a second-stage DCI search space set may include an aggregation level, a number of PDCCH candidates for each configured aggregation level, a duration of a PMO in a number of OFDM symbols, and/or a starting symbol of a PMO in a slot.

As described above, the network node may indicate common scheduling information via the first-stage DCI (e.g., common to multiple second-stage DCIs) and/or long-term scheduling information (e.g., scheduling information that changes less frequently relative to other scheduling information). The long-term scheduling information may be UE-specific scheduling information or common scheduling information. Alternatively, or additionally, the network node may indicate transmission-specific scheduling information via the second-stage DCI. The network node may transmit the first-stage DCI using a first beamwidth that is wider than a second beamwidth that the network node may use to transmit the second-stage DCI. The wider beamwidth may enable the network node to transmit the first-stage DCI with more spatial coverage relative to the second beamwidth and increase a probability that the UE detects the first-stage DCI.

FIG. 5B illustrates a second example 502 of associating the stages of multi-stage DCI. In the second example 502, the multi-stage DCI is in the form of two-stage DCI, a horizontal axis represents time, and a vertical axis represents frequency. In some aspects, first-stage DCI may be associated with multiple second-stage DCIs. As one example, each second-stage DCI of the multiple second-stage DCI may be transmitted by a respective network node, such as a respective TRP. To illustrate, a first network node (e.g., a first TRP) may be configured to transmit the first-stage DCI and/or may be associated with first-stage DCI PMOs (shown in solid white). Alternatively, or additionally, the first network node may be associated with first second-stage DCI PMOs (shown with a diagonal pattern) and a second network node (e.g., a second TRP) may be associated with second second-stage DCI PMOs (shown with a dotted pattern). That is, the first network node may transmit a first second-stage DCI based at least in part on the first second-stage DCI PMOs and the second network node may transmit a second second-stage DCI based at least in part on the second second-stage PMOs. The first second-stage DCI PMOs that are associated with the first network node may be based at least in part on a first CORESET that is configured based at least in part on a first bandwidth as shown by reference number 512, and the second second-stage DCI PMOs may be based at least in part on a second CORESET that is configured based at least in part on a second bandwidth as shown by reference number 516. Accordingly, the second-stage DCI PMOs may be based at least in part on a different CORESET bandwidths.

To illustrate, one or more network nodes (e.g., the first network node and/or the second network node) may transmit one or more search set IEs that indicate respective search space configuration information associated with the first-stage DCI PMOs, the first second-stage DCI PMOs, and/or the second second-stage DCI PMOs. To indicate an association between the first-stage DCI PMOs, the first second-stage DCI PMOs, and the second second-stage DCI PMOs, each search set IE may include a respective two-stage DCI search space association ID field (e.g., twoStageDCISSAssociationID) that is set to a same value and/or same ID in a similar manner as described above. Alternatively, or additionally, the network node(s) may transmit one or more CORESET IEs that indicate respective CORESET configuration information associated with the first-stage DCI PMOs, the first second-stage DCI PMOs, and/or the second second-stage DCI. To indicate an association between the first-stage DCI PMOs, the first second-stage DCI PMOs, and the second second-stage DCI PMOs, each CORESET IE may include a respective two-stage DCI CORESET association ID field (e.g., twoStageDCICORESETAssociationID) that is set to a same value and/or a same ID. Accordingly, in some aspects, first-stage DCI may be associated with multiple second-stage DCIs (e.g., from multiple network nodes, from multiple TRPs, and/or in multiple second-stage DCI PMOs on each network node).

Figures 5C, 5D:
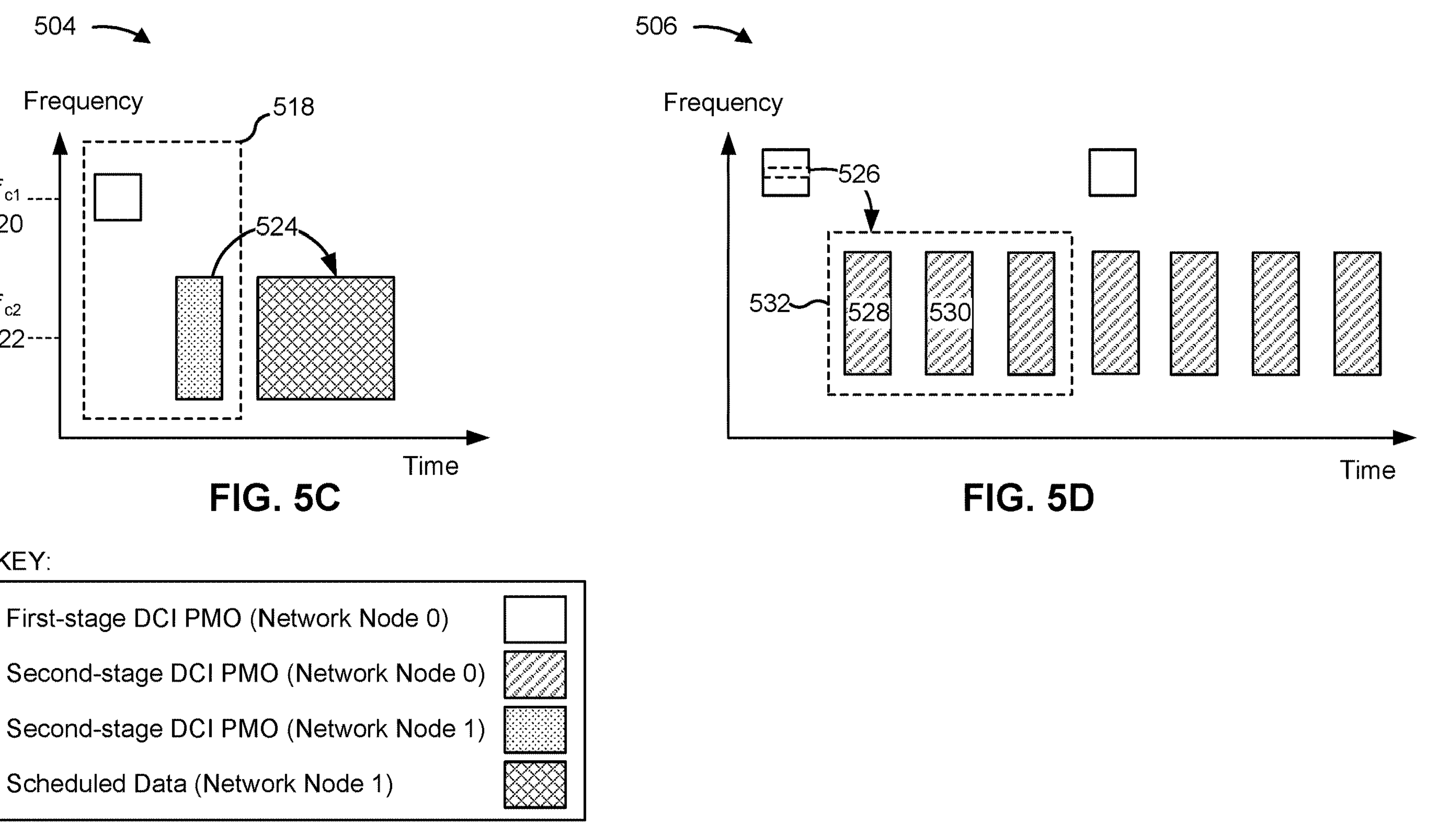

FIG. 5C illustrates a third example 504 of associating the stages of multi-stage DCI. In the third example 504, the multi-stage DCI is in the form of two-stage DCI, a horizontal axis represents time, and a vertical axis represents frequency. In some aspects, two-stage DCI as shown by reference number 518 may be cross-carrier two-stage DCI. To illustrate, a scheduling network node (e.g., a first network node) may transmit first-stage DCI based at least in part on a first carrier 520 (shown as $f_{c1}$), and a scheduled network node (e.g., a second network node that may be scheduled by the scheduling network node) may transmit second-stage DCI based at least in part on a second carrier 522 (shown as $f_{c2}$). That is, the first-stage DCI and the second-stage DCI may be cross-carrier two-stage DCI that based at least in part on at least two different carrier frequencies. By configuring the scheduled network node to transmit the second-stage DCI (e.g., via the second carrier 522), the scheduling network node may offload control signaling to the scheduled network node and/or free resources at the scheduling network node for other tasks to increase a capacity of the wireless network. In some aspects, the association between the first-stage DCI and the second-stage DCI of the cross-carrier two-stage DCI may be based at least in part on the first-stage DCI and the second-stage DCI being configured with a same SS set ID. To illustrate, the scheduling network node may transmit first SS set configuration information that is associated with the first-stage DCI and indicates a particular SS set ID. A UE may identify the SS set ID in the first SS set configuration information and determine to recover the second-stage DCI based at least in part on the SS set ID indicated in the first SS set configuration information. That is, the SS set ID indicated in the first configuration information may implicitly indicate a SS set ID for the second-stage DCI. Alternatively, or additionally, the scheduling network node may transmit second SS set configuration information that is associated with the second-stage DCI and indicates the same particular SS set ID.

In some aspects, first-stage DCI and second-stage DCI may be based at least in part on dedicated DCI formats that jointly provide complete scheduling information for a data transmission (shown with a diamond pattern) as shown by reference number 524. To illustrate, the first-stage DCI may be based at least in part on a first DCI format (e.g., a first-stage DCI format) and the second-stage DCI may be based at least in part on a second DCI format (e.g., a second-stage DCI format). To calculate a location of and/or recover the data transmission, a UE may detect the first DCI format and, based at least in part on detecting the first DCI format, may detect and/or recover the second-stage DCI using the second DCI format. That is, detecting the presence of the first DCI format may implicitly indicate a pending transmission of second-stage DCI and/or that the second-stage DCI will be based at least in part on the second DCI format. The UE may recover the data transmission based at least in part on recovering the joint information (i.e., information that is used together) included in the first-stage DCI and the second-stage DCI.

Alternatively, or additionally, the UE may detect that the first-stage DCI is formatted based at least in part on a first DCI format (e.g., a first-stage DCI includes a first set of scheduling fields in the DCI format) and subsequently determine that the second-stage DCI is formatted based at least in part on a second DCI format (e.g., a second-stage DCI includes a second set of scheduling fields in the DCI format) and/or uses a same DCI format as the first-stage DCI. For example, the UE may receive an indication of two-stage DCI (e.g., via a two-stage DCI association ID as described with regard to FIGS. 5A and 5B), detect that the first-stage DCI is formatted based at least in part on a particular DCI format, and determine to recover the second-stage DCI using the same particular DCI format. That is, the UE may recover information (e.g., joint information, common information, and/or transmission specific information) from the first-stage DCI and the second-stage DCI using a same DCI format to recover the information from both stages based at least in part on the first-stage DCI and the second-stage DCI being part of a same multi-stage DCI (e.g., a same two-stage DCI). Alternatively, or additionally, the UE may recover information from the first-stage DCI based at least in part on the first DCI format and recover information from the second-stage DCI based at least in part on the second DCI format.

FIG. 5D illustrates a fourth example 506 of associating the stages of multi-stage DCI. In the fourth example 506, the multi-stage DCI is in the form of two-stage DCI, a horizontal axis represents time, and a vertical axis represents frequency. In some aspects, and as shown by reference number 526, first-stage DCI may indicate one or more second-stage DCI PMOs for a second-stage DCI that is part of a same multi-stage DCI. That is, the first-stage DCI may indicate an association with the second-stage DCI based at least in part on indicating one or more second-stage DCI PMOs to monitor for detecting the second-stage DCI. As one example, the first-stage DCI may include an offset field that indicates a starting PMO of the second-stage DCI PMOs and/or a length field that indicates a number of PMOs associated with the second-stage DCI PMOs. In some aspects, an offset indicated by the offset field may be relative to the first-stage DCI. For instance, an offset of zero may indicate to start monitoring for the second-stage DCI in a first second-stage DCI PMO that occurs after the first-stage DCI (e.g., second-stage DCI PMO 528), and an offset of one may indicate to start monitoring for the second-stage DCI in a second second-stage DCI PMO that occurs after the first-stage DCI (e.g., second-stage DCI PMO 530). Accordingly, the offset field and/or the length field may indicate an integer value that has a unit of second-stage DCI PMOs. In the fourth example 506, the first-stage DCI indicates an association with one or more second-stage DCIs that may be located in the three PMOs included in a monitoring window 532.

Figure 5E:
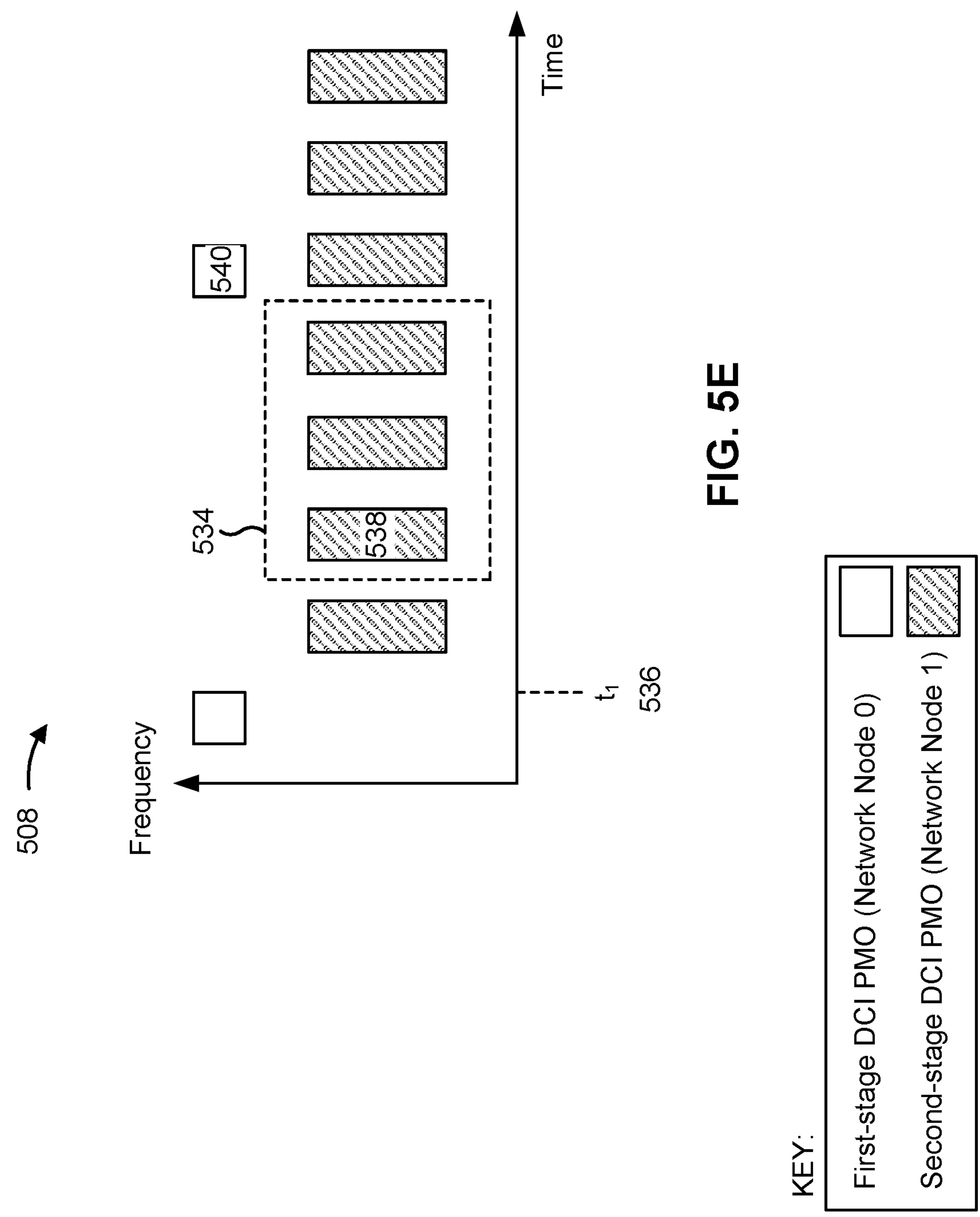

FIG. 5E illustrates a fifth example 508 of associating the stages of multi-stage DCI. In the fifth example 508, the multi-stage DCI is in the form of two-stage DCI, a horizontal axis represents time, and a vertical axis represents frequency. In some aspects, an association between first-stage DCI and second-stage DCI of a same multi-stage DCI (e.g., a two-stage DCI) may be based at least in part on a monitoring window 534. That is, and in a similar manner as described with regard to the fourth example 506, the second-stage DCI that is associated with the first-stage DCI may be a second-stage DCI that UE detects within the monitoring window 534. Characteristics of the monitoring window 534 (e.g., a start time, a duration, and/or an end time) may be indicated by a network node and/or may be specified by a communication standard. As one example, the network node may transmit an indication of a start time and/or a duration of the monitoring window 534 in RRC signaling. As another example, the communication standard may specify a value for the start time and/or the duration of the monitoring window 534. In a similar manner as described with regard to the fourth example 506, the network node and/or the communication standard may indicate and/or specify the characteristics based at least in part on using an integer and/or a unit of second-stage DCI PMOs. Alternatively, or additionally, the characteristics may be based at least in part on the first-stage DCI.

To illustrate, a reference time 536 (shown as t) may be associated with an end transmission time of first-stage DCI (shown in solid white), and the network node and/or communication standard may specify an offset of one to indicate that the monitoring window 534 starts at the second second-stage PMO 538 that occurs after the reference time 536. Alternatively, or additionally, the network node and/or the communication standard may indicate a second offset value and/or length that specifies an ending PMO associated with the monitoring window 534. In some aspects, the duration of the monitoring window 534 and/or a number of PMOs included in the monitoring window may be implicit and/or based at least in part on a start time of a second first-stage DCI PMO 540. For instance, an end of the monitoring window 534 may be based at least in part on a last second-stage DCI PMO that completes prior to a start transmission time of the second first-stage DCI PMO 540 and/or an end transmission time of the second first-stage DCI PMO 540. Accordingly, the association between a first-stage DCI and a second-stage DCI may be based at least in part on second-stage DCI PMOs that occur in between first-stage DCI PMOs.

Indicating of an association between the stages of a multi-stage DCI may enable a UE to correctly detect and/or recover each stage and, subsequently, transmit and/or receive communications with the network node. The use of multi-stage DCI, and the indication of an association between the stages, may enable a network node to configure each stage transmission differently (e.g., with different CORESETs and/or different SS sets) to meet operating criteria and preserve air interface resources in a wireless network. Preserving air interface resources may also enable the network node to increase a capacity of the wireless network and/or serve more UEs.

As indicated above, FIGS. 5A, 5B, 5C, 5D, and 5E are provided as examples. Other examples may differ from what is described with respect to FIGS. 5A, 5B, 5C, 5D, and 5E.

Figure 6:
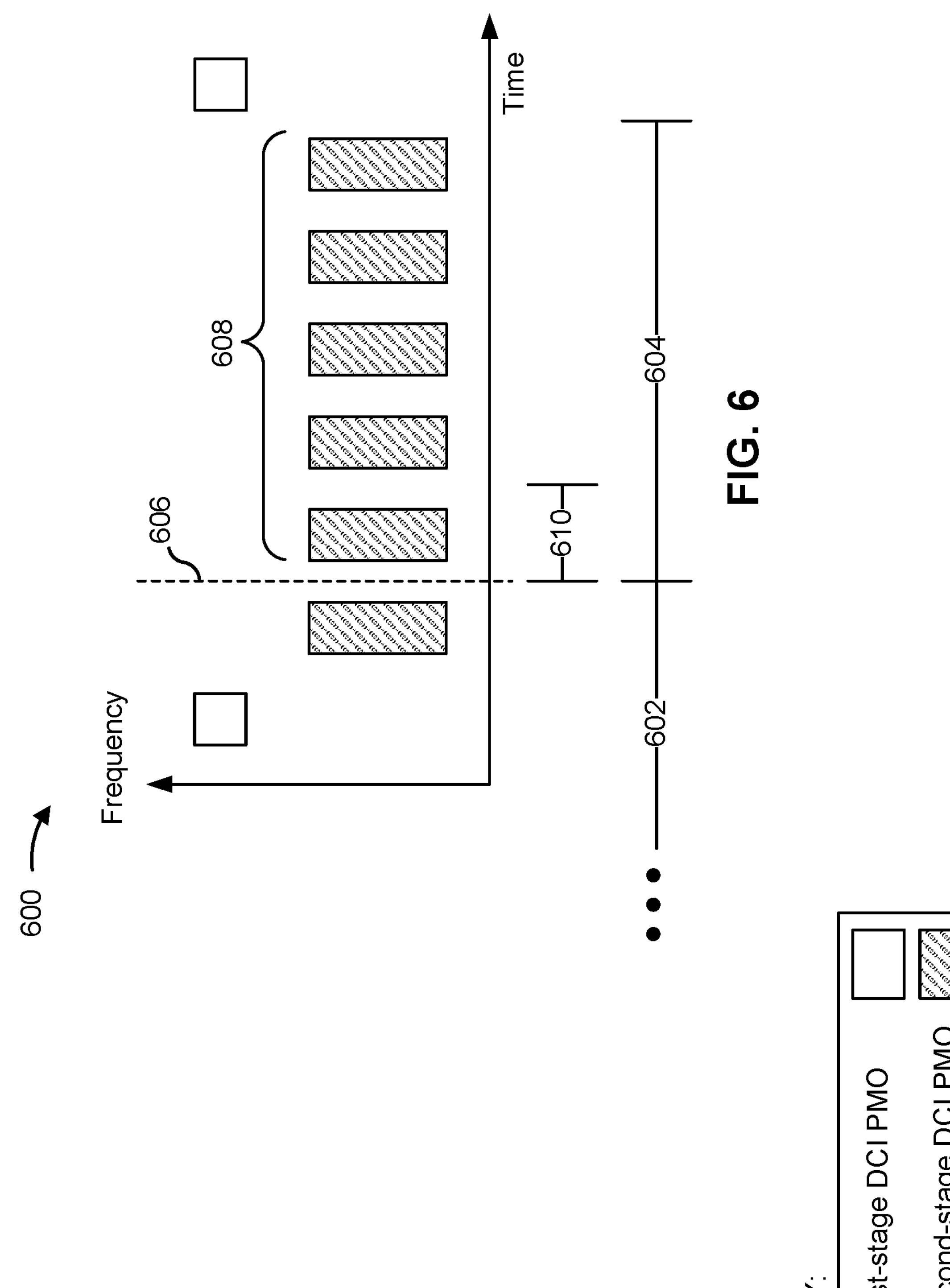
FIG. 6 is a diagram illustrating an example of configuring blind detection for multi-stage DCI, in accordance with the present disclosure.

FIG. 6 is a diagram illustrating an example 600 of configuring blind detection for multi-stage DCI, in accordance with the present disclosure.

How a UE calculates a number of blind detections to perform for multi-stage DCI may differ from how a UE calculates a number of blind detections for single-stage DCI. To illustrate, for single-stage DCI, the UE may calculate a maximum number of blind detections based at least in part on a time partition, such as a slot and/or a sub-slot, and/or a number of PDCCH candidates in a PMO that is included in the time partition. For multi-stage DCI, the time partition may include multiple PMOs associated with different stages, such as a first-stage DCI PMO and/or a second-stage DCI PMO.

In some aspects, a total number of blind detections may include a first number of blind detections associated with first-stage DCI, a second number of blind detections associated with second-stage DCI, and/or a third number of blind detections associated with single-stage DCI. Accordingly, for multi-stage DCI, a UE may calculate a number of blind detections to perform based at least in part on a time partition (e.g., a slot and/or a sub-slot) that includes a second-stage DCI PMO. To illustrate, the UE may calculate the number of blind detections based at least in part on a number of PDCCH candidates that are configured for a second-stage DCI PMO based at least in part on a search space configuration. For instance, the UE may calculate the number of blind detections for the second-stage DCI as the same number of PDCCH candidates that are configured for the second-stage DCI PMO based at least in part on the search space configuration (e.g., the total number of PDCCH candidates for the second-stage DCI).

As another example, the UE may calculate the number of blind detections to perform based at least in part on a maximum number of DCIs that the UE may be capable of receiving and/or decoding in a time duration. To illustrate, the UE may obtain, based at least in part on decoded first-stage DCI, information that indicates which second-stage DCI PDCCH candidates to decode. The number of second-PDCCH candidates indicated based at least in part on the decoded first-stage DCI may be configured to not exceed a maximum number of DCIs that the UE may be specified to receive and/or is capable of receiving. In some aspects, the maximum number of DCIs that the UE is capable of and/or supports receiving and/or decoding may be equal to the total number of PDCCH candidates configured for and/or associated with the second-stage DCI PMO (e.g., via the search space configuration). In other aspects, the maximum number of DCIs that the UE supports receiving may be fewer and/or smaller than the total number of PDCCH candidates configured for and/or associated with the second-stage DCI PMO. To illustrate, the maximum number of DCIs that the UE supports receiving in a time duration may be based at least in part on a UE capability, such as a UE capability associated with uplink data scheduling and/or a UE capability associated with downlink data scheduling. As one example, for frequency division duplex (FDD), the UE may be directed to receive a maximum number of one downlink DCI and one uplink DCI in a time duration. For time division duplex (TDD), the UE may be directed to receive a maximum number of one downlink DCI and two uplink DCIs and/or two downlink DCIs and one uplink DCI in the time duration.

Alternatively, or additionally, the maximum number of DCIs that the UE supports receiving and/or decoding may be based at least in part on first-stage DCI received and/or decoded by the UE that indicates one or more PDCCH candidates associated with the second-stage DCI. That is, the maximum number of DCIs that the UE supports receiving and/or decoding may be independent of whether the DCI is a first-stage DCI and/or second-stage DCI.

In some aspects, the UE may calculate the maximum number of DCIs to detect based at least in part on a minimum offset between the first-stage DCI's PMO and the associated second-stage DCI PMOs. FIG. 6 illustrates the example 600 that includes multi-stage DCI in the form of two-stage DCI, a horizontal axis of the example 600 represents time, and a vertical axis of the example 600 represents frequency. First-stage DCI PMOs are shown in solid white, and second-stage DCI PMOs are shown with a diagonal pattern. In some aspects, for a first duration 602, a UE may calculate a maximum number of blind detections based at least in part on a number of configured PDCCH candidates that occur within the first duration 602. For a second duration 604, the UE may calculate the maximum number of blind detections based at least in part on a maximum number of DCI for the UE to receive. In some aspects, the UE may be configured with and/or directed to receive (e.g., via a network node and/or a communication standard) the maximum number of DCI to receive. Alternatively, or additionally, the UE may utilize a minimum offset 606 to calculate the maximum number of DCIs. For example, a network node may transmit an indication of the minimum offset, a communication standard may specify the minimum offset, and/or the UE may calculate the minimum offset based at least in part on a processing time by the UE that is associated with decoding an instance of first-stage DCI. To illustrate, the network node, the communication standard, and/or the UE may specify and/or calculate the minimum offset as an integer value that has a unit of second-stage DCI PMOs and/or is an offset that is based at least in part on a first-stage DCI PMO. In the example 600, the minimum offset 606 has a value of one.

In some aspects, the a UE may calculate the maximum number of blind detections based at least in part on the second-stage DCI PMOs shown by reference number 608 that occur after the minimum offset 604 and/or are within a time partition 610 (e.g., a slot and/or a sub-slot) that is located within the second duration 604. In some aspects, and as shown by FIG. 6, the UE may refrain from performing a blind detection on at least one of the configured PDCCH candidates associated with second-stage DCI within the second duration 610 and, subsequently, preserve a battery life of the UE.

As indicated above, FIG. 6 is provided as an example. Other examples may differ from what is described with regard to FIG. 6.

Figure 7:
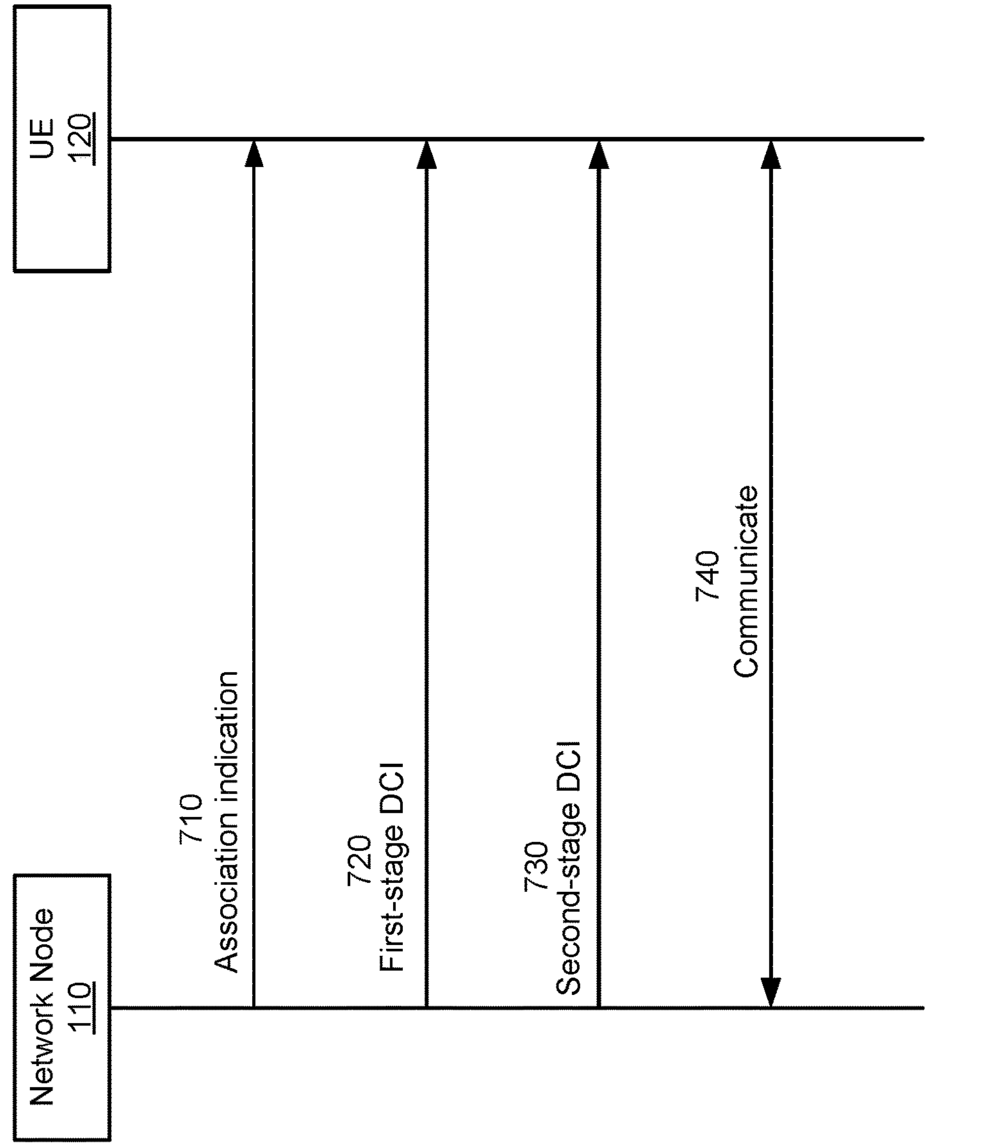
FIG. 7 is a diagram illustrating an example of a wireless communication process between a network node and a UE, in accordance with the present disclosure.

FIG. 7 is a diagram illustrating an example 700 of a wireless communication process between a network node 110 and a UE 120, in accordance with the present disclosure.

As shown by reference number 710, a network node 110 may transmit, and a UE 120 may receive, an indication of an association between two or more stages of multi-stage DCI. As one example, the association may be between first-stage DCI and second-stage DCI of two-stage DCI. Other examples may include more than two stages.

In some aspects, the network node 110 may transmit first PDCCH configuration information that is associated with first-stage DCI, such as PDCCH configuration information that indicates a CORESET configuration associated with the first-stage DCI and/or an SS set configuration associated with the first-stage DCI. Alternatively, or additionally, the network node 110 may transmit second PDCCH configuration information that is associated with second-stage DCI. As one example, the network node 110 may transmit PDCCH configuration information in a system information block (SIB). In other examples, a second network node (e.g., another network node 110) that is different from the network node 110 may transmit the second PDCCH configuration information.

To indicate an association between the first-stage DCI and the second-stage DCI, the network node 110 configure the first PDCCH configuration information and the second PDCCH configuration information with a same identifier (e.g., a two-stage DCI association identifier). To illustrate, the first PDCCH configuration information and the second PDCCH configuration information may each specify respective SS set configuration information as described with regard to FIG. 5A, and the respective SS set configuration may include a two-stage DCI SS association ID. The network node 110 may indicate an association between the first-stage DCI and the second-stage DCI based at least in part on setting each respective two-stage DCI SS association identifier to a same value and/or a same ID. The respective SS set configuration information that is associated with the first-stage DCI may indicate a different SS set configuration (e.g., a different PMO configuration) relative to the respective SS set configuration information that is associated with the second-stage DCI.

Alternatively, or additionally, the network node 110 may indicate a first CORESET configuration as at least part of the first PDCCH configuration information and/or a second CORESET configuration as at least in part of the second PDCCH configuration information, and the first CORESET configuration may indicate same and/or different resources than the second CORESET configuration. To illustrate, a first CORESET may be configured (e.g., via the first CORESET configuration) with a first bandwidth and the second CORESET may be configured (e.g., via the second CORESET configuration) with a second bandwidth that has a different size than the first bandwidth (e.g., the second bandwidth may be larger than the first bandwidth). To indicate an association between the first-stage DCI and the second-stage DCI, the network node 110 indicate a same value and/or same ID for a respective two-stage DCI CORESET association ID included in the first CORESET configuration and the second CORESET configuration. In some aspects, and based at least in part on indicating a same two-stage DCI CORESET association ID in the respective PDCCH configuration information (e.g., the respective CORESET configuration included in the PDCCH configuration information), the network node 110 may indicate a particular SS set ID in the first PDCCH configuration information and the same particular SS set ID in the second PDCCH configuration information.

In some aspects, first-stage DCI may be associated with multiple second-stage DCI as described with regard to FIG. 5B. For instance, the network node 110 may transmit first PDCCH configuration information that is associated with first-stage DCI, second PDCCH configuration information that is associated with a first second-stage DCI, and/or third PDCCH configuration information that is associated with a second second-stage DCI. To indicate an association between the first-stage DCI and the multiple second-stage DCI, each respective PDCCH configuration information may indicate a same particular two-stage DCI association (e.g., a two-stage DCI SS association ID and/or a two-stage DCI CORESET association ID). That is, the respective PDCCH configuration information may indicate a same value and/or same ID for a respective two-stage DCI association ID. The first PDCCH configuration information, the second PDCCH configuration information, and/or the third PDCCH configuration information may indicate different configurations (e.g., different bandwidths and/or PMOs) from one another as described above.

In some aspects, the indication of an association between first-stage DCI and second-stage DCI may be based at least in part on a SS set ID. To illustrate, the network node 110 may transmit first PDCCH configuration information that includes first SS set configuration information that is associated with first-stage DCI and indicates a particular SS set identifier. As described above, the UE 120 may identify the SS set ID in the first SS set configuration information and determine to recover the second-stage DCI based at least in part on the SS set ID indicated in the first SS set configuration information. That is, the association between the first-stage DCI and the second-stage DCI may be based at least in part on the first-stage DCI and the second-stage DCI being configured and/or associated with a same SS set ID. Alternatively, or additionally, the network node 110 may transmit second PDCCH configuration information second SS set configuration information that is associated with the second-stage DCI and indicates the same particular SS set ID.

In some aspects, to indicate an association between first-stage DCI and second-stage DCI, the network node 110 may transmit an indication of a monitoring window as described with regard to FIGS. 5D and/or 5E. That is, a monitoring window may be RRC configured by the network node 110. However, in other examples, the monitoring window may be specified by a communication standard. To illustrate, the communication standard may specify one or rules that characterize the monitoring window (e.g., a communication standard rule-based monitoring window).

As shown by reference number 720, the network node 110 may transmit, and the UE 120 may receive, first-stage DCI that is associated with multi-stage DCI. The network node 110 may transmit the first-stage DCI based at least in part on first PDCCH configuration information as described with regard to reference number 710.

While FIG. 7 shows the network node 110 transmitting the first-stage DCI separately from the indication of the association between the first-stage DCI and the second-stage DCI, other examples may include the network node 110 transmitting the indication of the association in the first-stage DCI, such as via an offset field that that indicates a monitoring occasion and/or a monitoring window as described with regard to FIG. 5D. That is, instead of transmitting a two-stage DCI association identifier in respective PDCCH configuration information as described with regard to reference number 710, the network node 110 may indicate the association in the first-stage DCI. To illustrate, the offset field may indicate a starting PMO of second-stage DCI PMOs and/or a length field that indicates a number of second-stage DCI to monitor for associated second-stage DCI as described with regard to FIG. 5D.

In some aspects, the network node 110 may transmit the first-stage DCI based at least in part on using a first beamwidth that is different from a second beamwidth used to transmit associated second-stage DCI as described with regard to FIG. 5A. Alternatively, or additionally, the first-stage DCI may indicate common scheduling information that is associated with multiple UEs, common scheduling information that is associated with multiple second-stage DCIs and/or UE-specific scheduling information that is associated with a single UE. As described with regard to FIG. 5C, the network node 110 may transmit the first-stage DCI based at least in part on a first carrier that is at a different frequency than a second carrier that is used to transmit second-stage DCI (e.g., by the network node 110 and/or a second network node 110).

As shown by reference number 730, the network node 110 may transmit, and the UE 120 may receive, second-stage DCI that is associated with the first-stage DCI. In some aspects, the UE 120 may receive and/or recover the second-stage DCI based at least in part on the indication of an association between the first-stage DCI and the second-stage DCI, such as an indication that is based at least in part on a two-stage DCI association ID, an indication carried in first-stage DCI, and/or an indication that is based at least in part on a rule specified by a communication standard.

As one example, the UE 120 may receive and/or recover the second-stage DCI based at least in part on a monitoring occasion and/or a monitoring window that is based at least in part on the first-stage DCI, specified by the first-stage DCI and/or a communication standard as described with regard to FIGS. 5D and 5E. Alternatively, or additionally, the UE 120 may receive the second-stage DCI based at least in part on a second beamwidth that is narrower than the first beamwidth and/or a second carrier that is different from a first carrier as described above. The second-stage DCI may include transmission-specific scheduling information (e.g., specific to a scheduled transmission) and/or joint scheduling information that is based at least in part on the first-stage DCI.

For visual brevity, FIG. 7 shows the same network node transmitting the first-stage DCI and the second-stage DCI, but in other examples, different network nodes may transmit the first-stage DCI and the second-stage DCI. For example, and as described with regard to FIG. 5B, the second-stage DCI may be one of multiple second-stage DCIs (e.g., transmitted by different network nodes and/or TRPs) and/or may be transmitted by a second network node that is scheduled by a first network node that transmitted the first-stage DCI as described with regard to FIG. 5C.

In some aspects, the UE 120 may recover the recover the second-stage DCI using a second DCI format that is based at least in part on a DCI format association between the first-stage DCI and the second-stage DCI. For instance, and as described above with regard to FIG. 5C, the first-stage DCI may be based at least in part on a first DCI format and, based at least in part on detecting the first DCI format, the UE 120 determine to recover the second-stage DCI using a second DCI format that is the same DCI format or a different DCI format than the first DCI. That is, detecting the presence of the first DCI format may implicitly indicate a pending transmission of second-stage DCI and/or a DCI format associated with the second-stage. Alternatively, or additionally, the UE 120 may identify, receive, and/or recover an associated second-stage DCI based at least in part on a monitoring window that is based at least in part on the first-stage DCI.

In some aspects, the UE 120 may receive and/or recover the second-stage DCI based at least in part on determining and/or calculating a blind detection threshold as described with regard to FIG. 6. For example, the blind detection threshold based at least in part on a monitoring duration associated with the second-stage DCI, a number of configured PDCCH candidates associated with a search space configuration for the second-stage DCI (e.g., one or more second-stage PMOs), and/or a maximum number of DCIs that the UE 120 is configured to receive in the monitoring duration. For example, the maximum numbers of DCIs that the UE 120 is configured and/or able to receive during the monitoring duration may be based at least in part on any combination of a UE capability, a PDCCH candidate indicated by the first-stage DCI, and/or a minimum offset associated with the first-stage DCI and second-stage DCI as described above.

As shown by reference number 740, the network node 110 and the UE 120 may communicate with one another based at least in part on the first-stage DCI and the associated second-stage DCI. As one example, the UE 120 may recovering user data based at least in part on the first-stage DCI and the second-stage DCI. Alternatively, or additionally, the UE 120 may transmit user data based at least in part on the first-stage DCI and the second-stage DCI.

Indicating of an association between the stages of a multi-stage DCI may enable a UE to correctly detect and/or recover each stage and, subsequently, transmit and/or receive communications with the network node. The use of multi-stage DCI, and the indication of an association between the stages, may enable a network node to configure each stage transmission differently (e.g., with different CORESETs and/or different SS sets) to meet operating criteria and preserve air interface resources in a wireless network. Preserving air interface resources may also enable the network node to increase a capacity of the wireless network and/or serve more UEs.

As indicated above, FIG. 7 is provided as an example. Other examples may differ from what is described with regard to FIG. 7.

Figure 8:
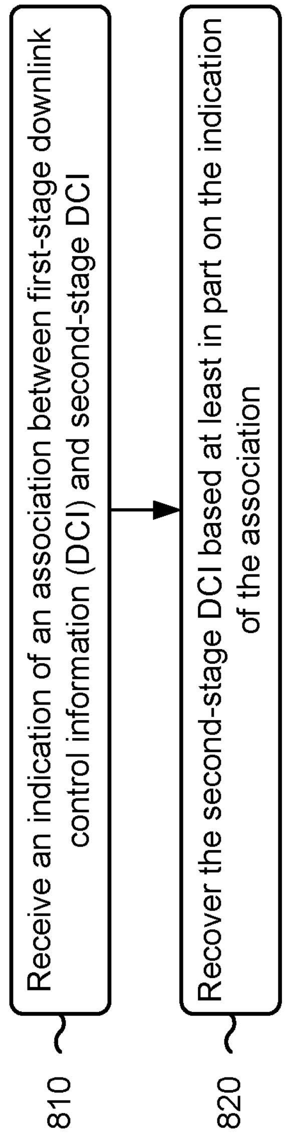
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with associating multi-stage DCI.

As shown in FIG. 8, in some aspects, process 800 may include receiving an indication of an association between first-stage DCI and second-stage DCI (block 810). For example, the UE (e.g., using reception component 1002 and/or communication manager 1006, depicted in FIG. 10) may receive an indication of an association between first-stage DCI and second-stage DCI, as described above.

As further shown in FIG. 8, in some aspects, process 800 may include recovering the second-stage DCI based at least in part on the indication of the association (block 820). For example, the UE (e.g., using communication manager 1006, depicted in FIG. 10) may recover the second-stage DCI based at least in part on the indication of the association, as described above.

Process 800 may include additional aspects, such as any single aspect or any combination of aspects described below and/or in connection with one or more other processes described elsewhere herein.

In a first aspect, process 800 includes receiving first PDCCH configuration information that is associated with the first-stage DCI, and receiving second PDCCH configuration information that is associated with the second-stage DCI, the indication of the association between the first-stage DCI and the second-stage DCI includes the first PDCCH configuration information and the second PDCCH configuration information specifying a same identifier.

In a second aspect, the same identifier is a two-stage DCI SS association identifier, the first PDCCH configuration information includes a first SS set configuration that indicates the two-stage DCI SS association identifier, and the second PDCCH configuration information includes a second SS set configuration that indicates the two-stage DCI SS association identifier.

In a third aspect, the first SS set configuration is different from the second SS set configuration.

In a fourth aspect, the first PDCCH configuration information indicates a first CORESET, and the second PDCCH configuration information indicates a second CORESET that includes one or more different resources than the first CORESET.

In a fifth aspect, the first CORESET is configured with a first bandwidth, and the second CORESET is configured with a second bandwidth that has a different size than the first bandwidth.

In a sixth aspect, the same identifier is a two-stage DCI CORESET association identifier, the first PDCCH configuration information includes a first CORESET configuration that specifies the two-stage DCI CORESET association identifier, and the second PDCCH configuration information includes a second CORESET configuration that specifies the two-stage DCI CORESET association identifier.

In a seventh aspect, the first PDCCH configuration information includes a first SS set configuration that indicates a particular SS set identifier, and the second PDCCH configuration information includes a second SS set configuration that indicates the particular SS set identifier.

In an eighth aspect, process 800 includes receiving the first-stage DCI based at least in part on a first beamwidth, and receiving the second-stage DCI based at least in part on a second beamwidth that is narrower than the first beamwidth.

In a ninth aspect, process 800 includes receiving common scheduling information in the first-stage DCI, and receiving transmission-specific scheduling information in the second-stage DCI.

In a tenth aspect, the second-stage DCI is one of multiple second-stage DCIs, and the indication of the association indicates that the first-stage DCI is associated with each second-stage DCI of the multiple second-stage DCIs.

In an eleventh aspect, process 800 includes receiving first PDCCH configuration information that is associated with the first-stage DCI and the first PDCCH configuration information indicates a particular two-stage DCI association identifier, receiving second PDCCH configuration information for a first second-stage DCI of the multiple second-stage DCI, and the second PDCCH configuration information indicates the particular two-stage DCI association identifier, and receiving third PDCCH configuration information for a second second-stage DCI of the multiple second-stage DCI and the third PDCCH configuration information indicates the particular two-stage DCI association identifier.

In a twelfth aspect, the particular two-stage DCI association identifier includes at least one of a two-stage DCI SS association identifier, or a two-stage DCI CORESET association identifier.

In a thirteenth aspect, the second PDCCH configuration information is different from the third PDCCH configuration information.

In a fourteenth aspect, process 800 includes receiving the first-stage DCI in a first carrier, and receiving the second-stage DCI in a second carrier.

In a fifteenth aspect, process 800 includes receiving first PDCCH configuration information for the first-stage DCI that indicates a particular SS set identifier, and receiving second PDCCH configuration information for the second-stage DCI that indicates the particular SS set identifier, the indication of the association being based at least in part on the particular SS set identifier.

In a sixteenth aspect, process 800 includes recovering user data in the second carrier based at least in part on the first-stage DCI and the second-stage DCI.

In a seventeenth aspect, process 800 includes recovering the first-stage DCI based at least in part on a first DCI format, and recovering the second-stage DCI is based at least in part on a second DCI format and a DCI format association between the first-stage DCI and the second-stage DCI.

In an eighteenth aspect, process 800 includes receiving the first-stage DCI, the first-stage DCI indicates a monitoring occasion associated with receiving the second-stage DCI, and receiving the second-stage DCI is based at least in part on the monitoring occasion.

In a nineteenth aspect, the first-stage DCI indicates the monitoring occasion based at least in part on an offset field.

In a twentieth aspect, the offset field indicates a first monitoring occasion and a number of monitoring occasions.

In a twenty-first aspect, process 800 includes receiving the first-stage DCI, and receiving the second-stage DCI based at least in part on a monitoring window that is based at least in part on the first-stage DCI.

In a twenty-second aspect, process 800 includes determining a blind detection threshold based at least in part on a monitoring duration associated with the second-stage DCI, and recovering the second-stage DCI based at least in part on the blind detection threshold.

In a twenty-third aspect, determining the blind detection threshold includes determining the blind detection threshold based at least in part on a number of configured PDCCH candidates associated with a search space configuration for the second-stage DCI.

In a twenty-fourth aspect, determining the blind detection threshold includes determining the blind detection threshold based at least in part on a maximum number of DCIs that the UE is configured to receive in the monitoring duration.

In a twenty-fifth aspect, determining the blind detection threshold is based at least in part on at least one of a UE capability, a PDCCH candidate indicated by the first-stage DCI, or a minimum offset associated with the first-stage DCI and second-stage DCI.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
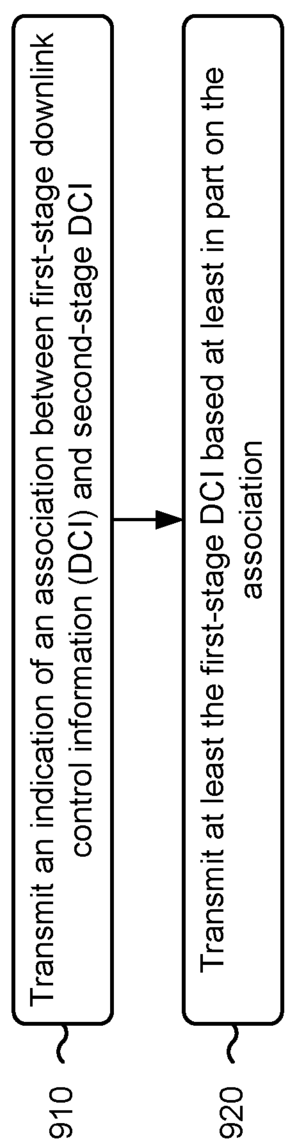
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with associating multi-stage DCI.

As shown in FIG. 9, in some aspects, process 900 may include transmitting an indication of an association between first-stage DCI and second-stage DCI (block 910). For example, the network node (e.g., using transmission component 1104 and/or communication manager 1106, depicted in FIG. 11) may transmit an indication of an association between first-stage DCI and second-stage DCI, as described above.

As further shown in FIG. 9, in some aspects, process 900 may include transmitting at least the first-stage DCI based at least in part on the association (block 920). For example, the network node (e.g., using transmission component 1104 and/or communication manager 1106, depicted in FIG. 11) may transmit at least the first-stage DCI based at least in part on the association, as described above.

Process 900 may include additional aspects, such as any single aspect or any combination of aspects described below and/or in connection with one or more other processes described elsewhere herein.

In a first aspect, process 900 includes transmitting the second-stage DCI based at least in part on the association.

In a second aspect, process 900 includes transmitting first PDCCH configuration information that is associated with the first-stage DCI, and transmitting second PDCCH configuration information that is associated with the second-stage DCI, the indication of the association between the first-stage DCI and the second-stage DCI includes the first PDCCH configuration information and the second PDCCH configuration information specifying a same identifier.

In a third aspect, the same identifier is a two-stage DCI SS association identifier, the first PDCCH configuration information includes a first SS set configuration that indicates the two-stage DCI SS association identifier, and the second PDCCH configuration information includes a second SS set configuration that indicates the two-stage DCI SS association identifier.

In a fourth aspect, the first SS set configuration is different from the second SS set configuration.

In a fifth aspect, the first PDCCH configuration information indicates a first CORESET, and the second PDCCH configuration information indicates a second CORESET that includes one or more different resources than the first CORESET.

In a sixth aspect, the first CORESET is configured with a first bandwidth, and the second CORESET is configured with a second bandwidth that has a different size than the first bandwidth.

In a seventh aspect, the same identifier is a two-stage DCI CORESET association identifier, the first PDCCH configuration information includes a first CORESET configuration that specifies the two-stage DCI CORESET association identifier, and the second PDCCH configuration information includes a second CORESET configuration that specifies the two-stage DCI CORESET association identifier.

In an eighth aspect, the first PDCCH configuration information includes a first SS set configuration that indicates a particular SS set identifier, and the second PDCCH configuration information includes a second SS set configuration that indicates the particular SS set identifier.

In a ninth aspect, process 900 includes transmitting the first-stage DCI based at least in part on a first beamwidth, and transmitting the second-stage DCI based at least in part on a second beamwidth that is narrower than the first beamwidth.

In a tenth aspect, process 900 includes transmitting common scheduling information in the first-stage DCI, and transmitting transmission-specific scheduling information in the second-stage DCI.

In an eleventh aspect, process 900 includes transmitting the first-stage DCI, the first-stage DCI indicates a monitoring occasion associated with receiving the second-stage DCI, and transmitting the second-stage DCI based at least in part on the monitoring occasion.

In a twelfth aspect, the first-stage DCI indicates the monitoring occasion based at least in part on an offset field.

In a thirteenth aspect, the offset field indicates a first monitoring occasion and a number of monitoring occasions.

In a fourteenth aspect, the offset field indicates a first monitoring occasion that is associated with a monitoring window.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
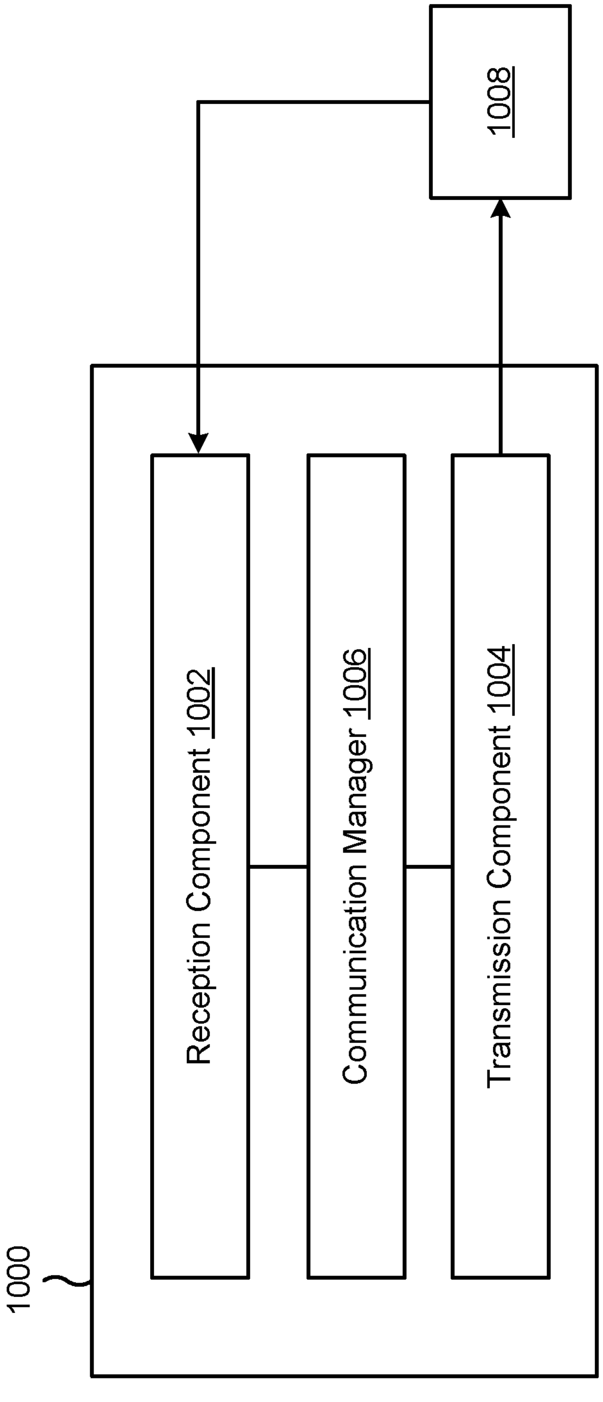
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a UE, or a UE may include the apparatus 1000. In some aspects, the apparatus 1000 includes a reception component 1002, a transmission component 1004, and/or a communication manager 1006, which may be in communication with one another (for example, via one or more buses and/or one or more other components). In some aspects, the communication manager 1006 is the communication manager 140 described in connection with FIG. 1. As shown, the apparatus 1000 may communicate with another apparatus 1008, such as a UE or a network node (such as a CU, a DU, an RU, or a base station), using the reception component 1002 and the transmission component 1004.

In some aspects, the apparatus 1000 may be configured to perform one or more operations described herein in connection with FIGS. 4-9. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1008. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, one or more memories, or a combination thereof, of the UE described in connection with FIG. 2.

The transmission component 1004 may transmit communications, such as reference signals, control information, data communications, or a combination thereof, to the apparatus 1008. In some aspects, one or more other components of the apparatus 1000 may generate communications and may provide the generated communications to the transmission component 1004 for transmission to the apparatus 1008. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1004 may include one or more antennas, a modem, a modulator, a transmit MIMO processor, a transmit processor, a controller/processor, one or more memories, or a combination thereof, of the UE described in connection with FIG. 2. In some aspects, the transmission component 1004 may be co-located with the reception component 1002 in a transceiver.

The communication manager 1006 may support operations of the reception component 1002 and/or the transmission component 1004. For example, the communication manager 1006 may receive information associated with configuring reception of communications by the reception component 1002 and/or transmission of communications by the transmission component 1004. Additionally, or alternatively, the communication manager 1006 may generate and/or provide control information to the reception component 1002 and/or the transmission component 1004 to control reception and/or transmission of communications.

The communication manager 1006 may receive, by way of the reception component 1002, an indication of an association between first-stage DCI and second-stage DCI. The communication manager 1006 may recover the second-stage DCI based at least in part on the indication of the association.

The communication manager 1006 may receive, by way of the reception component 1002, first PDCCH configuration information that is associated with the first-stage DCI. Alternatively, or additionally, the communication manager 1006 may receive, by way of the reception component 1002, second PDCCH configuration information that is associated with the second-stage DCI, and the indication of the association between the first-stage DCI and the second-stage DCI includes the first PDCCH configuration information and the second PDCCH configuration information specifying a same identifier.

The reception component 1002 may receive the first-stage DCI based at least in part on a first beamwidth. Alternatively, or additionally, the reception component 1002 may receive the second-stage DCI based at least in part on a second beamwidth that is narrower than the first beamwidth.

The communication manager 1006 may receive, by way of the reception component 1002, common scheduling information in the first-stage DCI. Alternatively, or additionally, the communication manager 1006 may receive, by way of the reception component 1002, transmission-specific scheduling information in the second-stage DCI. In some aspects, the communication manager 1006 may receive, by way of the reception component 1002, first PDCCH configuration information that is associated with the first-stage DCI, and the first PDCCH configuration information indicates a particular two-stage DCI association identifier. In some aspects, the communication manager 1006 may receive, by way of the reception component 1002, second PDCCH configuration information for a first second-stage DCI of the multiple second-stage DCI, and the second PDCCH configuration information indicates the particular two-stage DCI association identifier. At times, the communication manager 1006 may receive, by way of the reception component 1002, third PDCCH configuration information for a second second-stage DCI of the multiple second-stage DCI, and the third PDCCH configuration information indicates the particular two-stage DCI association identifier.

The reception component 1002 may receive the first-stage DCI in a first carrier. Alternatively, or additionally, the reception component 1002 may receive the second-stage DCI in a second carrier.

The communication manager 1006 may receive, by way of the reception component 1002, first PDCCH configuration information for the first-stage DCI that indicates a particular SS set identifier. Alternatively, or additionally, the communication manager 1006 may receive, by way of the reception component 1002, second PDCCH configuration information for the second-stage DCI that indicates the particular SS set identifier, and the indication of the association is based at least in part on the particular SS set identifier.

The communication manager 1006 may recover user data in the second carrier based at least in part on the first-stage DCI and the second-stage DCI. In some aspects, the communication manager 1006 may recover the first-stage DCI based at least in part on a first DCI format. Alternatively, or additionally, the communication manager 1006 may recover the second-stage DCI based at least in part on a second DCI format and a DCI format association between the first-stage DCI and the second-stage DCI.

The communication manager 1006 may receive, by way of the reception component 1002, the first-stage DCI, and the first-stage DCI indicates a monitoring occasion associated with receiving the second-stage DCI. The communication manager 1006 may receive, by way of the reception component 1002, the second-stage DCI based at least in part on the monitoring occasion. The communication manager 1006 may receive, by way of the reception component 1002, the first-stage DCI, and the second-stage DCI based at least in part on a monitoring window that is based at least in part on the first-stage DCI.

The communication manager 1006 may determine a blind detection threshold based at least in part on a monitoring duration associated with the second-stage DCI. Alternatively, or additionally, the communication manager 1006 may recover the second-stage DCI based at least in part on the blind detection threshold.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
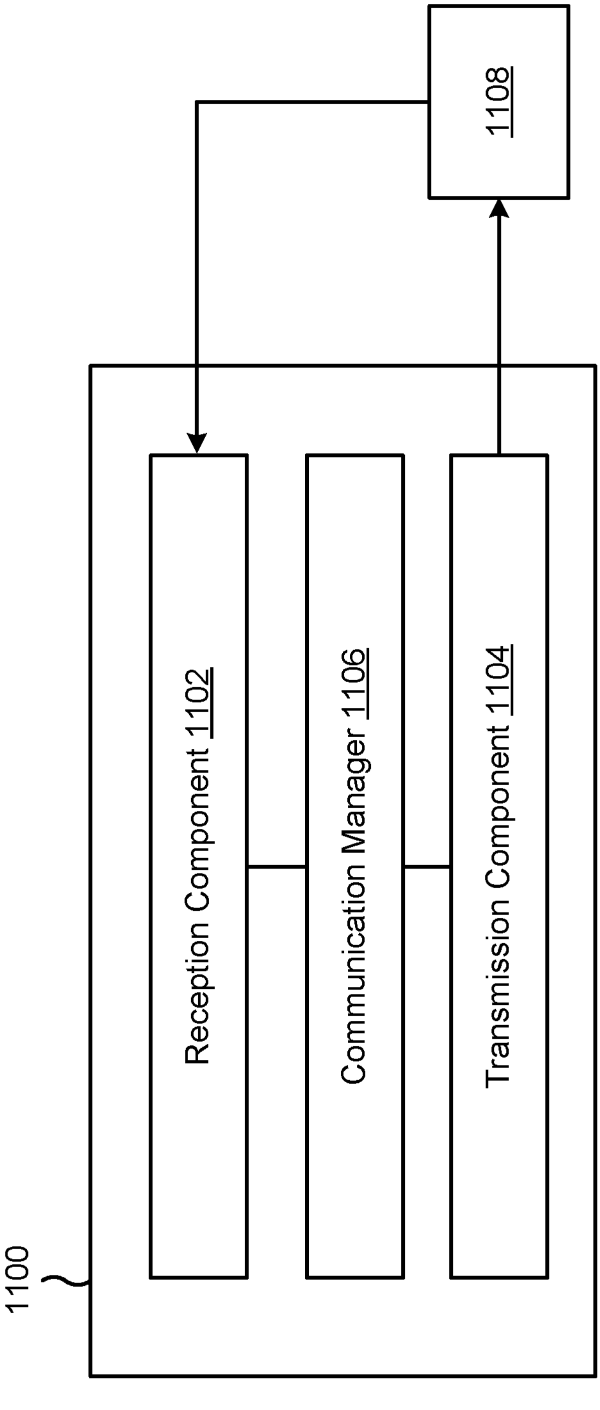
FIG. 11 is a diagram of an example apparatus for wireless communication, in accordance with the present disclosure.

FIG. 11 is a diagram of an example apparatus 1100 for wireless communication, in accordance with the present disclosure. The apparatus 1100 may be a network node, or a network node may include the apparatus 1100. In some aspects, the apparatus 1100 includes a reception component 1102, a transmission component 1104, and/or a communication manager 1106, which may be in communication with one another (for example, via one or more buses and/or one or more other components). In some aspects, the communication manager 1106 is the communication manager 150 described in connection with FIG. 1. As shown, the apparatus 1100 may communicate with another apparatus 1108, such as a UE or a network node (such as a CU, a DU, an RU, or a base station), using the reception component 1102 and the transmission component 1104.

In some aspects, the apparatus 1100 may be configured to perform one or more operations described herein in connection with FIGS. 4-9. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the network node described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in one or more memories. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1108. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, one or more memories, or a combination thereof, of the network node described in connection with FIG. 2. In some aspects, the reception component 1102 and/or the transmission component 1104 may include or may be included in a network interface. The network interface may be configured to obtain and/or output signals for the apparatus 1100 via one or more communications links, such as a backhaul link, a midhaul link, and/or a fronthaul link.

The transmission component 1104 may transmit communications, such as reference signals, control information, data communications, or a combination thereof, to the apparatus 1108. In some aspects, one or more other components of the apparatus 1100 may generate communications and may provide the generated communications to the transmission component 1104 for transmission to the apparatus 1108. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1104 may include one or more antennas, a modem, a modulator, a transmit MIMO processor, a transmit processor, a controller/processor, one or more memories, or a combination thereof, of the network node described in connection with FIG. 2. In some aspects, the transmission component 1104 may be co-located with the reception component 1102 in a transceiver.

The communication manager 1106 may support operations of the reception component 1102 and/or the transmission component 1104. For example, the communication manager 1106 may receive information associated with configuring reception of communications by the reception component 1102 and/or transmission of communications by the transmission component 1104. Additionally, or alternatively, the communication manager 1106 may generate and/or provide control information to the reception component 1102 and/or the transmission component 1104 to control reception and/or transmission of communications.

The communication manager 1106 may transmit, by way of the transmission component 1104, an indication of an association between first-stage DCI and second-stage DCI. The communication manager may transmit, by way of the transmission component 1104, at least the first-stage DCI based at least in part on the association. In some aspects, the communication manager 1106 may transmit, by way of the transmission component 1104, the second-stage DCI based at least in part on the association.

The communication manager may transmit, by way of the transmission component 1104, first PDCCH configuration information that is associated with the first-stage DCI and second PDCCH configuration information that is associated with the second-stage DCI. In some aspects, the indication of the association between the first-stage DCI and the second-stage DCI includes the communication manager 1106 specifying a same identifier in the first PDCCH configuration information and the second PDCCH configuration information.

The transmission component 1104 may transmit the first-stage DCI based at least in part on a first beamwidth. Alternatively, or additionally, the transmission component 1104 may transmit the second-stage DCI based at least in part on a second beamwidth that is narrower than the first beamwidth.

The communication manager may transmit, by way of the transmission component 1104, common scheduling information in the first-stage DCI. Alternatively, or additionally, the communication manager may transmit, by way of the transmission component 1104, transmission-specific scheduling information in the second-stage DCI.

The communication manager may transmit, by way of the transmission component 1104, the first-stage DCI, and the first-stage DCI indicates a monitoring occasion associated with receiving the second-stage DCI. Alternatively, or additionally, the communication manager may transmit, by way of the transmission component 1104, the second-stage DCI based at least in part on the monitoring occasion.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving an indication of an association between first-stage downlink control information (DCI) and second-stage DCI; and recovering the second-stage DCI based at least in part on the indication of the association.

Aspect 2: The method of Aspect 1, further comprising: receiving first physical downlink control channel (PDCCH) configuration information that is associated with the first-stage DCI; and receiving second PDCCH configuration information that is associated with the second-stage DCI, wherein the indication of the association between the first-stage DCI and the second-stage DCI comprises the first PDCCH configuration information and the second PDCCH configuration information specifying a same identifier.

Aspect 3: The method of Aspect 2, wherein the same identifier is a two-stage DCI search space (SS) association identifier, wherein the first PDCCH configuration information comprises a first SS set configuration that indicates the two-stage DCI SS association identifier, and wherein the second PDCCH configuration information comprises a second SS set configuration that indicates the two-stage DCI SS association identifier.

Aspect 4: The method of Aspect 3, wherein the first SS set configuration is different from the second SS set configuration.

Aspect 5: The method of Aspect 3, wherein the first PDCCH configuration information indicates a first control resource set (CORESET), and wherein the second PDCCH configuration information indicates a second CORESET that includes one or more different resources than the first CORESET.

Aspect 6: The method of Aspect 5, wherein the first CORESET is configured with a first bandwidth, and wherein the second CORESET is configured with a second bandwidth that has a different size than the first bandwidth.

Aspect 7: The method of Aspect 2, wherein the same identifier is a two-stage DCI control resource set (CORESET) association identifier, wherein the first PDCCH configuration information comprises a first CORESET configuration that specifies the two-stage DCI CORESET association identifier, and wherein the second PDCCH configuration information comprises a second CORESET configuration that specifies the two-stage DCI CORESET association identifier.

Aspect 8: The method of Aspect 7, wherein the first PDCCH configuration information comprises a first search space (SS) set configuration that indicates a particular SS set identifier, and wherein the second PDCCH configuration information comprises a second SS set configuration that indicates the particular SS set identifier.

Aspect 9: The method of any of Aspects 1-8, further comprising: receiving the first-stage DCI based at least in part on a first beamwidth; and receiving the second-stage DCI based at least in part on a second beamwidth that is narrower than the first beamwidth.

Aspect 10: The method of any of Aspects 1-9, further comprising: receiving common scheduling information in the first-stage DCI; and receiving transmission-specific scheduling information in the second-stage DCI.

Aspect 11: The method of any of Aspects 1-10, wherein the second-stage DCI is one of multiple second-stage DCIs, and wherein the indication of the association indicates that the first-stage DCI is associated with each second-stage DCI of the multiple second-stage DCIs.

Aspect 12: The method of Aspect 11, further comprising: receiving first physical downlink control channel (PDCCH) configuration information that is associated with the first-stage DCI, wherein the first PDCCH configuration information indicates a particular two-stage DCI association identifier; receiving second PDCCH configuration information for a first second-stage DCI of the multiple second-stage DCI, wherein the second PDCCH configuration information indicates the particular two-stage DCI association identifier; and receiving third PDCCH configuration information for a second second-stage DCI of the multiple second-stage DCI, wherein the third PDCCH configuration information indicates the particular two-stage DCI association identifier.

Aspect 13: The method of Aspect 12, wherein the particular two-stage DCI association identifier comprises at least one of: a two-stage DCI search space (SS) association identifier, or a two-stage DCI control resource set (CORESET) association identifier.

Aspect 14: The method of Aspect 12, wherein the second PDCCH configuration information is different from the third PDCCH configuration information.

Aspect 15: The method of any of Aspects 1-14, further comprising: receiving the first-stage DCI in a first carrier; and receiving the second-stage DCI in a second carrier.

Aspect 16: The method of Aspect 14, further comprising: receiving first physical downlink control channel (PDCCH) configuration information for the first-stage DCI that indicates a particular search space (SS) set identifier; and receiving second PDCCH configuration information for the second-stage DCI that indicates the particular SS set identifier, wherein the indication of the association is based at least in part on the particular SS set identifier.

Aspect 17: The method of Aspect 15, further comprising: recovering user data in the second carrier based at least in part on the first-stage DCI and the second-stage DCI.

Aspect 18: The method of any of Aspects 1-17, further comprising: recovering the first-stage DCI based at least in part on a first DCI format; and recovering the second-stage DCI based at least in part on a second DCI format and a DCI format association between the first-stage DCI and the second-stage DCI.

Aspect 19: The method of any of Aspects 1-18, further comprising: receiving the first-stage DCI, wherein the first-stage DCI indicates a monitoring occasion associated with receiving the second-stage DCI; and receiving the second-stage DCI based at least in part on the monitoring occasion.

Aspect 20: The method of Aspect 19, wherein the first-stage DCI indicates the monitoring occasion based at least in part on an offset field.

Aspect 21: The method of Aspect 20, wherein the offset field indicates a starting monitoring occasion and a number of monitoring occasions.

Aspect 22: The method of any of Aspects 1-21, further comprising: receiving the first-stage DCI; and receiving the second-stage DCI based at least in part on a monitoring window that is based at least in part on the first-stage DCI.

Aspect 23: The method of Aspect 22, wherein the monitoring window comprises: a radio resource control (RRC) configured monitoring window, or a communication standard rule-based monitoring window.

Aspect 24: The method of any of Aspects 1-23, further comprising: determining a blind detection threshold based at least in part on a monitoring duration associated with the second-stage DCI; and recovering the second-stage DCI based at least in part on the blind detection threshold.

Aspect 25: The method of Aspect 24, wherein determining the blind detection threshold comprises: determining the blind detection threshold based at least in part on a number of configured physical downlink control channel (PDCCH) candidates associated with a search space configuration for the second-stage DCI.

Aspect 26: The method of Aspect 24, wherein determining the blind detection threshold comprises: determining the blind detection threshold based at least in part on a maximum number of DCIs that the UE is configured to receive in the monitoring duration.

Aspect 27: The method of Aspect 26, wherein determining the blind detection threshold is based at least in part on at least one of: a UE capability, a PDCCH candidate indicated by the first-stage DCI, or a minimum offset associated with the first-stage DCI and second-stage DCI.

Aspect 28: A method of wireless communication performed by a network node, comprising: transmitting an indication of an association between first-stage downlink control information (DCI) and second-stage DCI; and transmitting at least the first-stage DCI based at least in part on the association.

Aspect 29: The method of Aspect 28, further comprising: transmitting the second-stage DCI based at least in part on the association.

Aspect 30: The method of any of Aspects 28-29, further comprising: transmitting first physical downlink control channel (PDCCH) configuration information that is associated with the first-stage DCI; and transmitting second PDCCH configuration information that is associated with the second-stage DCI, wherein the indication of the association between the first-stage DCI and the second-stage DCI comprises the first PDCCH configuration information and the second PDCCH configuration information specifying a same identifier.

Aspect 31: The method of Aspect 30, wherein the same identifier is a two-stage DCI search space (SS) association identifier, wherein the first PDCCH configuration information comprises a first SS set configuration that indicates the two-stage DCI SS association identifier, and wherein the second PDCCH configuration information comprises a second SS set configuration that indicates the two-stage DCI SS association identifier.

Aspect 32: The method of Aspect 31, wherein the first SS set configuration is different from the second SS set configuration.

Aspect 33: The method of Aspect 31, wherein the first PDCCH configuration information indicates a first control resource set (CORESET), and wherein the second PDCCH configuration information indicates a second CORESET that includes one or more different resources than the first CORESET.

Aspect 34: The method of Aspect 33, wherein the first CORESET is configured with a first bandwidth, and wherein the second CORESET is configured with a second bandwidth that has a different size than the first bandwidth.

Aspect 35: The method of Aspect 30, wherein the same identifier is a two-stage DCI control resource set (CORESET) identifier, wherein the first PDCCH configuration information comprises a first CORESET configuration that specifies the two-stage DCI CORESET association identifier, and wherein the second PDCCH configuration information comprises a second CORESET configuration that specifies the two-stage DCI CORESET association identifier.

Aspect 36: The method of Aspect 35, wherein the first PDCCH configuration information comprises a first search space (SS) set configuration that indicates a particular SS set identifier, and wherein the second PDCCH configuration information comprises a second SS set configuration that indicates the particular SS set identifier.

Aspect 37: The method of any of Aspects 28-36, further comprising: transmitting the first-stage DCI based at least in part on a first beamwidth; and transmitting the second-stage DCI based at least in part on a second beamwidth that is narrower than the first beamwidth.

Aspect 38: The method of any of Aspects 28-37, further comprising: transmitting common scheduling information in the first-stage DCI; and transmitting transmission-specific scheduling information in the second-stage DCI.

Aspect 39: The method of any of Aspects 28-38, further comprising: transmitting the first-stage DCI, wherein the first-stage DCI indicates a monitoring occasion associated with receiving the second-stage DCI; and transmitting the second-stage DCI based at least in part on the monitoring occasion.

Aspect 40: The method of Aspect 39, wherein the first-stage DCI indicates the monitoring occasion based at least in part on an offset field.

Aspect 41: The method of Aspect 40, wherein the offset field indicates a first monitoring occasion and a number of monitoring occasions.

Aspect 42: The method of Aspect 40, wherein the offset field indicates a first monitoring occasion that is associated with a monitoring window.

Aspect 43: An apparatus for wireless communication at a device, comprising one or more processors; one or more memories coupled with the one or more processors; and instructions stored in the one or more memories and executable by the one or more processors, individually or collectively, to cause the apparatus to perform the method of one or more of Aspects 1-27.

Aspect 44: An apparatus for wireless communication at a device, comprising one or more processors; one or more memories coupled with the one or more processors; and instructions stored in the one or more memories and executable by the one or more processors, individually or collectively, to cause the apparatus to perform the method of one or more of Aspects 28-42.

Aspect 45: A device for wireless communication, comprising one or more memories and one or more processors coupled to the one or more memories, the one or more processors configured, individually or collectively, to perform the method of one or more of Aspects 1-27.

Aspect 46: A device for wireless communication, comprising one or more memories and one or more processors coupled to the one or more memories, the one or more processors configured, individually or collectively, to perform the method of one or more of Aspects 28-42.

Aspect 47: An apparatus for wireless communication, comprising at least one means for performing the method of one or more of Aspects 1-27.

Aspect 48: An apparatus for wireless communication, comprising at least one means for performing the method of one or more of Aspects 28-42.

Aspect 49: A non-transitory computer-readable medium storing code for wireless communication, the code comprising instructions executable by a processor to perform the method of one or more of Aspects 1-27.

Aspect 50: A non-transitory computer-readable medium storing code for wireless communication, the code comprising instructions executable by a processor to perform the method of one or more of Aspects 28-42.

Aspect 51: A non-transitory computer-readable medium storing a set of instructions for wireless communication, the set of instructions comprising one or more instructions that, when executed by one or more processors of a device, cause the device to perform the method of one or more of Aspects 1-27.

Aspect 52: A non-transitory computer-readable medium storing a set of instructions for wireless communication, the set of instructions comprising one or more instructions that, when executed by one or more processors of a device, cause the device to perform the method of one or more of Aspects 28-42.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:

one or more memories; and one or more processors, coupled to the one or more memories, that, individually or collectively, are configured to:

receive an indication of an association between first-stage downlink control information (DCI) and second-stage DCI, the indication of the association comprising configuration information specifying a same two-stage DCI identifier for the first-stage DCI and the second-stage DCI;

recover the first-stage DCI based at least in part on a first DCI format; and recover the second-stage DCI using a second DCI format that is based at least in part on the association.

2. The apparatus of claim 1, wherein the configuration information comprises at least one of: first physical downlink control channel (PDCCH) configuration information that is associated with the first-stage DCI, or second PDCCH configuration information that is associated with the second-stage DCI, and wherein the one or more processors are further configured to:

receive the first PDCCH configuration information; or receive the second PDCCH configuration information.

3. The apparatus of claim 2, wherein the same two-stage DCI identifier is a two-stage DCI search space (SS) association identifier, wherein the first PDCCH configuration information comprises a first SS set configuration that indicates the two-stage DCI SS association identifier, and wherein the second PDCCH configuration information comprises a second SS set configuration that indicates the two-stage DCI SS association identifier.

4. The apparatus of claim 2, wherein the same two-stage DCI identifier is a two-stage DCI control resource set (CORESET) association identifier, wherein the first PDCCH configuration information comprises a first CORESET configuration that specifies the two-stage DCI CORESET association identifier, and wherein the second PDCCH configuration information comprises a second CORESET configuration that specifies the two-stage DCI CORESET association identifier.

5. The apparatus of claim 4, wherein the first PDCCH configuration information comprises a first search space (SS) set configuration that indicates a particular SS set identifier, and wherein the second PDCCH configuration information comprises a second SS set configuration that indicates the particular SS set identifier.

6. The apparatus of claim 1, wherein the second-stage DCI is one of multiple second-stage DCIs, and wherein the indication of the association indicates that the first-stage DCI is associated with each second-stage DCI of the multiple second-stage DCIs.

7. The apparatus of claim 6, wherein the configuration information comprises first physical downlink control channel (PDCCH) configuration information that is associated with the first-stage DCI, and wherein the one or more processors are further configured to:

receive the first PDCCH configuration information, wherein the first PDCCH configuration information indicates a particular two-stage DCI association identifier;

receive second PDCCH configuration information for a first second-stage DCI of the multiple second-stage DCIs, wherein the second PDCCH configuration information indicates the particular two-stage DCI association identifier; and receive third PDCCH configuration information for a second second-stage DCI of the multiple second-stage DCIs, wherein the third PDCCH configuration information indicates the particular two-stage DCI association identifier.

8. The apparatus of claim 7, wherein the particular two-stage DCI association identifier comprises at least one of:

a two-stage DCI search space (SS) association identifier, or a two-stage DCI control resource set (CORESET) association identifier.

9. The apparatus of claim 1, wherein the one or more processors are further configured to:

receive the first-stage DCI in a first carrier; and receive the second-stage DCI in a second carrier.

10. The apparatus of claim 9, wherein the one or more processors are further configured to:

receive first physical downlink control channel (PDCCH) configuration information for the first-stage DCI that indicates a particular search space (SS) set identifier; and receive second PDCCH configuration information for the second-stage DCI that indicates the particular SS set identifier, wherein the indication of the association is based at least in part on the particular SS set identifier.

11. The apparatus of claim 1, wherein the association includes a DCI format association.

12. The apparatus of claim 1, wherein the one or more processors are further configured to:

receive the first-stage DCI, wherein the first-stage DCI indicates a monitoring occasion associated with receiving the second-stage DCI; and receive the second-stage DCI based at least in part on the monitoring occasion.

13. The apparatus of claim 1, wherein the one or more processors are further configured to:

receive the first-stage DCI, wherein the first-stage DCI indicates a monitoring window associated with receiving the second-stage DCI; and receive the second-stage DCI based at least in part on a monitoring window.

14. The apparatus of claim 1, wherein the one or more processors are further configured to:

determine a blind detection threshold based at least in part on a monitoring duration associated with the second-stage DCI; and recover the second-stage DCI based at least in part on the blind detection threshold.

15. The apparatus of claim 14, wherein the one or more processors, to determine the blind detection threshold, are configured to:

determine the blind detection threshold based at least in part on a number of configured physical downlink control channel (PDCCH) candidates associated with a search space configuration for the second-stage DCI.

16. An apparatus for wireless communication at a network node, comprising:

one or more memories; and one or more processors, coupled to the one or more memories, that, individually or collectively, are configured to:

transmit an indication of an association between first-stage downlink control information (DCI) and second-stage DCI, the indication of the association comprising configuration information specifying a same two-stage DCI identifier for the first-stage DCI and the second-stage DCI; and transmit the first-stage DCI and the second-stage DCI based at least in part on the association.

17. The apparatus of claim 16, wherein the configuration information comprises at least one of: first physical downlink control channel (PDCCH) configuration information that is associated with the first-stage DCI, or second PDCCH configuration information that is associated with the second-stage DCI, and wherein the one or more processors are further configured to:

transmit the first PDCCH configuration information; or transmit the second PDCCH configuration information.

18. The apparatus of claim 17, wherein the same two-stage DCI identifier is a two-stage DCI search space (SS) association identifier, wherein the first PDCCH configuration information comprises a first SS set configuration that indicates the two-stage DCI SS association identifier, and wherein the second PDCCH configuration information comprises a second SS set configuration that indicates the two-stage DCI SS association identifier.

19. The apparatus of claim 17, wherein the same two-stage DCI identifier is a two-stage DCI control resource set (CORESET) association identifier, wherein the first PDCCH configuration information comprises a first CORESET configuration that specifies the two-stage DCI CORESET association identifier, and wherein the second PDCCH configuration information comprises a second CORESET configuration that specifies the two-stage DCI CORESET association identifier.

20. The apparatus of claim 16, wherein the one or more processors are further configured to:

transmit the first-stage DCI, wherein the first-stage DCI indicates a monitoring occasion associated with receiving the second-stage DCI; and transmit the second-stage DCI based at least in part on the monitoring occasion.

21. A method of wireless communication performed by a user equipment (UE), comprising:

receiving an indication of an association between first-stage downlink control information (DCI) and second-stage DCI, the indication of the association comprising configuration information specifying a same two-stage DCI identifier for the first-stage DCI and the second-stage DCI;

recovering the first-stage DCI based at least in part on a first DCI format; and recovering the second-stage DCI using a second DCI format that is based at least in part on the association.

22. The method of claim 21, wherein the configuration information comprises at least one of: first physical downlink control channel (PDCCH) configuration information that is associated with the first-stage DCI, or second PDCCH configuration information that is associated with the second-stage DCI, the method further comprising:

receiving the first PDCCH configuration information; or receiving the second PDCCH configuration information.

23. The method of claim 21, wherein the second-stage DCI is one of multiple second-stage DCIs, and wherein the indication of the association indicates that the first-stage DCI is associated with each second-stage DCI of the multiple second-stage DCIs.

24. The method of claim 21, further comprising:

receiving the first-stage DCI in a first carrier; and receiving the second-stage DCI in a second carrier.

25. The method of claim 21, wherein the association includes a DCI format association.

26. The method of claim 22, further comprising:

receiving the first-stage DCI, wherein the first-stage DCI indicates a monitoring occasion associated with receiving the second-stage DCI; and receiving the second-stage DCI based at least in part on the monitoring occasion.

27. A method of wireless communication performed by a network node, comprising:

transmitting an indication of an association between first-stage downlink control information (DCI) and second-stage DCI, the indication of the association comprising configuration information specifying a same two-stage DCI identifier for the first-stage DCI and the second-stage DCI; and transmitting the first-stage DCI and the second-stage DCI based at least in part on the association.

28. The method of claim 27, wherein the configuration information comprises at least one of: first physical downlink control channel (PDCCH) configuration information that is associated with the first-stage DCI, or second PDCCH configuration information that is associated with the second-stage DCI, the method further comprising:

transmitting the first PDCCH configuration information; or transmitting the second PDCCH configuration information.

29. The method of claim 27, further comprising:

transmitting the first-stage DCI, wherein the first-stage DCI indicates a monitoring occasion associated with receiving the second-stage DCI; and transmitting the second-stage DCI based at least in part on the monitoring occasion.

30. The method of claim 27, wherein the association comprises the first-stage DCI being based at least in part on a first DCI format and the second-stage DCI being based at least in part on a second DCI format, wherein the DCI format of the first-stage DCI indicates the DCI format of the second-stage DCI.

* * * * *